US012792464B2

(12) United States Patent
Guha et al.

(10) Patent No.: US 12,792,464 B2
(45) Date of Patent: Nov. 10, 2026

(54) DATA VALIDATION AND MASTER NETWORK TECHNIQUES

(71) Applicant: TADA Cognitive Solutions, LLC, Peoria, IL (US)

(72) Inventors: Seshadri Guha, Peoria, IL (US); Vinay Sikka, Peoria, IL (US); Subbarao Turlapati, Peoria, IL (US)

(73) Assignee: TADA Cognitive Solutions, LLC, Peoria, IL (US)

( * ) Notice: Subject to any disclaimer, the term of this patent is extended or adjusted under 35 U.S.C. 154(b) by 0 days.

(21) Appl. No.: 18/785,054

(22) Filed: Jul. 26, 2024

(65) Prior Publication Data

US 2025/0103436 A1 Mar. 27, 2025

Related U.S. Application Data

(63) Continuation of application No. 17/952,385, filed on Sep. 26, 2022, now Pat. No. 12,050,517, which is a continuation of application No. 17/327,409, filed on May 21, 2021, now Pat. No. 11,455,588.

(60) Provisional application No. 63/074,849, filed on Sep. 4, 2020.

(51) Int. Cl.

| | |
|---|---|
| ***G06F 11/00*** | (2006.01) |
| ***G06F 11/14*** | (2006.01) |
| ***G06F 40/30*** | (2020.01) |

(52) U.S. Cl.
CPC .......... *G06F 11/1415* (2013.01); *G06F 40/30* (2020.01)

(58) Field of Classification Search
None
See application file for complete search history.

(56) References Cited

U.S. PATENT DOCUMENTS

| | | | |
|---|---|---|---|
| 5,905,498 | A | 5/1999 | Diament |
| 8,332,526 | B2 | 12/2012 | Kruse et al. |
| 8,429,179 | B1 | 4/2013 | Mirhaji |
| 8,719,299 | B2 | 5/2014 | Voigt et al. |
| 9,038,082 | B2 | 5/2015 | Maes |
| 9,424,520 | B1 | 8/2016 | Chow et al. |
| 9,582,495 | B2 | 2/2017 | Song |

(Continued)

OTHER PUBLICATIONS

Google Scholar/Patents search—text refined (Year: 2025).*

(Continued)

*Primary Examiner* — Christopher S McCarthy
(74) *Attorney, Agent, or Firm* — LEE SULLIVAN SHEA & SMITH LLP

(57) ABSTRACT

Disclosed herein are techniques and tools for verifying data for semantic correctness and/or verifying data for network correctness. In one respect, a method includes receiving input defining a validation point, the validation point comprising at least two or more validation functions applicable to (i) raw data and (ii) other data stored within a semantic network comprising nodes and links, importing source data; applying one or more transformations to the source data, populating the source data into one or more of the nodes and links comprising the semantic network, executing the validation point with respect the source data, based on the executing, determining one or more rules associated with the validation point are not satisfied, and based on the determining, revising either the source data or the other data stored within the semantic network.

21 Claims, 25 Drawing Sheets

(56) References Cited

U.S. PATENT DOCUMENTS

| | | | |
|---|---|---|---|
| 10,769,122 | B2 | 9/2020 | Gould et al. |
| 10,783,122 | B2 | 9/2020 | Farber et al. |
| 10,909,160 | B2 | 2/2021 | Guha et al. |
| 11,126,919 | B2 | 9/2021 | Lecue et al. |
| 11,580,479 | B2 | 2/2023 | Turlapati et al. |
| 2004/0083199 | A1 | 4/2004 | Govindugari et al. |
| 2008/0294599 | A1 | 11/2008 | Lei et al. |
| 2009/0160658 | A1 | 6/2009 | Armstrong et al. |
| 2012/0095973 | A1 | 4/2012 | Kehoe et al. |
| 2014/0012830 | A1 | 1/2014 | Hochwarth et al. |
| 2016/0028808 | A1 | 1/2016 | Arthursson et al. |
| 2016/0035114 | A1 | 2/2016 | Hesse et al. |
| 2017/0185674 | A1 | 6/2017 | Tonkin et al. |
| 2017/0364850 | A1 | 12/2017 | Johnston et al. |
| 2018/0173795 | A1 | 6/2018 | Cobbett et al. |
| 2021/0042589 | A1 | 2/2021 | Tokarev Sela et al. |
| 2021/0165816 | A1 | 6/2021 | Guha et al. |
| 2023/0088462 | A1 * | 3/2023 | Garrote ............... G06F 9/44526 717/126 |

OTHER PUBLICATIONS

Google Scholar/Patents search—text refined (Year: 2026).*

"Semantic network input validation rules—Google Patents." Google patents, Aug. 6, 2021, 11 pages [online], [retrieved on Aug. 11, 2021], Retrieved from the Internet: URL :<https://patents.google.com/?q=semantic+network+input+validation+rules&num=100&scholar&oq=semantic+network+input+validation+rules&sort=new>.

"Semantic network input validation rules—Google Patents." Google patents, Dec. 7, 2021, 11 pages [online], [retrieved on Dec. 10, 2021], Retrieved from the Internet: URL:<https://patents.google.com/?q=semantic+network+input+validation+rules&num=100&scholar&oq=semantic+network+input+validation+rules&sort=new>.

"Semantic network input validation rules—Google Patents." Google patents, May 7, 2022, 10 pages [online], [retrieved on May 7, 2022], Retrieved from the Internet: URL:<https://patents.google.com/?q=semantic+network+input+validation+rules&num=100&scholar&oq=semantic+network+input+validation+rules&sort=new>.

"Semantic network source data validation error—Google Patents." Google patents, Jul. 12, 2023, 2 pages [online], [retrieved on Jul. 20, 2023], Retrieved from the Internet: URL:<https://patents.google.com/?q=(semantic+network+source+data+validation+error)&scholar&oq=semantic+network+source+data+validation+error>.

"Semantic network source data validation error—Google Patents." Google patents, Mar. 14, 2024, 2 pages [online], [retrieved on Mar. 27, 2024], Retrieved from the Internet: URL:<https://patents.google.com/?q=(semantic+network+source+validation+error)&scholar&oq=semantic+network+source+validation+error>.

Wikipedia, "Semantic Web", https:/https://en.wikipedia.org/wiki/Semantic_Web, retrieved from the Internet on Feb. 14, 2020, pp. 1-15.

Wikipedia, "Web Ontology Language", https://en.wikipedia. org/wiki/Web_Ontology_Languager, retrieved from the Internet on Feb. 14, 2020, pp. 1-16.

International Searching Authority, International Search Report and Written Opinion, PCT/US2020/035104 mailed Aug. 27, 2020, 7 pages.

Salma Najar et al. 2009. Semantic representation of context models: a framework for analyzing and understanding. In Proceedings of the 1st Workshop on Context, Information and Ontologies (CIAO '09). Association for Computing Machinery, New York, NY, USA, Article 6, 1-10. (Year: 2009).

Non-Final Office Action mailed on Nov. 16, 2021, issued in connection with U.S. Appl. No. 17/466,823, filed Sep. 3, 2021, 30 pages.

Final Office Action mailed on Mar. 7, 2022, issued in connection with U.S. Appl. No. 17/466,823, filed Sep. 3, 2021, 14 pages.

Notice of Allowance mailed on Sep. 21, 2022, issued in connection with U.S. Appl. No. 17/466,823, filed Sep. 3, 2021, 9 pages.

* cited by examiner

1400

1410 Master Node 1

| FACTORY |
|---|
| F1 |
| F2 |
| F3 |

1420 Master Node 2

| PRODUCT |
|---|
| P1 |
| P2 |

1430 Source Data

| FACTORY | PRODUCT |
|---|---|
| F1 | P1 |
| F2 | P2 |
| F2 | ~~P3~~ |
| F3 | P1 |
| ~~F4~~ | ~~P3~~ |

1440 Master Link

| FACTORY | PRODUCT |
|---|---|
| F1 | P1 |
| F2 | P2 |
| F3 | P1 |

FIG. 14

2100

Country Table 2110

| Country Code | Country Name |
|---|---|
| US | United States of America |
| IN | India |
| CA | Canada |

Facility Table 2120

| Facility Code | Facility Name | Country Code |
|---|---|---|
| F1 | Facility 1 | US |
| F2 | Facility 2 | US |
| F3 | Facility 3 | IN |
| F4 | Facility 4 | IN |
| F5 | Facility 5 | CA |

Product Table 2130

| Product | Facility Code | Quantity | Sales |
|---|---|---|---|
| P1 | F1 | 1000 | $1.5M |
| P1 | F3 | 500 | $0.75M |
| P2 | F5 | 2000 | $2.8M |
| P2 | F3 | 600 | $1.9M |

FIG. 21

DATA VALIDATION AND MASTER NETWORK TECHNIQUES

CROSS-REFERENCE TO RELATED APPLICATION

This application is a continuation of, and claims the benefit of priority under 35 U.S.C. § 120 to, U.S. patent application Ser. No. 17/952,385, filed Sep. 26, 2022 and entitled "Data Validation and Master Network Techniques," which is a continuation of, and claims the benefit of priority under 35 U.S.C. § 120 to, U.S. patent application Ser. No. 17/327,409, filed May 21, 2021 and entitled "Data Validation and Master Network Techniques," which is a non-provisional of and claims the benefit of priority under 35 U.S.C. § 119(e) to U.S. Provisional Application No. 63/074,849, filed on Sep. 4, 2020 and titled "Master Network for a Digital Duplicate," the contents of each of which are hereby incorporated by reference herein for all purposes.

BACKGROUND

Businesses and other networks have a fundamental need to derive an understanding of their business/network at any moment in time, in order to engage in strategic & operational decision-making.

Overview

The disclosed digital duplicate creates a digital representation of the 'human' understanding of a business or other entity, comprising (1) a semantic network, (2) a synaptic data store, and (3) cognitive services. The digital representation is only as valuable as the correctness of the data being used, where often the data comes from multiple disparate sources that are authored and/or controlled by different people. Updates to the data may happen over time, which may cause the data to become incomplete and/or invalid. The digital duplicate can leverage the semantic network, synaptic data storage, and cognitive services to provide simple, adaptable, code-free methods to provide data correctness without requiring a detailed understanding of the data sources.

More specifically, data coming from multiple disparate sources that are authored and/or controlled by different people, business units, and or companies, typically contains errors and inconsistencies. The value of a digital representation is enhanced when it can provide insights into the correctness of the data. Updates to the data generally happen over time, which further compounds the likelihood that the data becomes incomplete and/or invalid.

Understanding the health of a business is essential to running a successful business, and the health is often determined from metrics using data collected across the business. However, the metrics are only valuable if the data collected/used is valid and/or correct. Too often business data is disjoint, owned and operated by different individuals/departments, and can include mistakes or gaps in the data. Traditional data systems require skilled analysts to develop programs to create metrics and import and analyze the data. These systems are often vulnerable to data gaps or mistakes, and a subject matter expert is often required to verify the results of the calculations.

Furthermore, most traditional data systems operate within a business unit or entity and do not have a notion of a database-driven network (e.g., "business network") that connects the data systems across many entities (e.g., business units). For example, a finance group may deal with accounting, a sales group deals with sales, an operations group may deal with manufacturing and operations, etc. The roll-up of data from one business unit may be provided as input to another business unit, but the data details behind the roll-up are typically hidden or withheld. These systems are often vulnerable to data gaps or mistakes, and a subject matter expert is often required to verify the results of all the calculations. This puts an unforeseen burden on the accuracy of the data that is provided from one business unit to another. In fact, significant effort is usually placed on making sure the data is "perfect" before entering it, which is extremely difficult and time consuming. Furthermore, incorrect or bad data is typically unsupported, and will often "break" a traditional data system.

Some examples of where data can break down in traditional systems include: mistakes present in data coming from one business unit are manually propagated to other business units, raw data may be bad and/or mislabeled, bad data transformations may lead to incorrect data, source file changes (e.g., removal of some attributes) may corrupt the system, the movement (or removal) of data sources may leave systems without data, database table schema of some field(s) may change, data for an entity (e.g., a person) may be moved to a new table or storage system that may keep the table intact but break subsequent data pipelines, and the like.

As disclosed herein, there are several ways to verify the "correctness" of data that is or will be populated in a digital duplicate. As one possibility, the data may be checked for syntactic correctness (e.g., if the digital duplicate is expecting an integer but receives a string). As another possibility the data may be checked for semantic correctness (e.g., where data may be syntactically correct but is not possible or appropriate within the parlance of the organization represented by the digital duplicate). For example, for an organization that sells chocolate manufactured at the chocolate plant and dog food manufactured at the dog food plant, data indicating that dog food was manufactured at the chocolate plant would almost certainly be semantically incorrect (even though it may be formatted correctly). Finally, as another possibility, the data may be checked for network correctness (e.g., the data may be checked by looking at existing data through multiple perspectives through the semantic network. For example, sales revenue data can be verified for network correctness by analyzing the sales data through multiple paths through the semantic network. One path may calculate sales revenue by looking at revenue as indicated by accounts receivable. Another path may calculate sales revenue by looking at revenue as indicated by the total number of widgets sold multiplied by the sales price of those widgets. If the sales revenue as indicated by looking at these two paths differs based on some predefined rule (e.g., a rule specifying an exact match between sales revenue or a rule specifying a threshold acceptable difference between sales revenue, then the sales revenue data may not be verified as correct.

Addressed herein are techniques and tools for verifying data for a semantic network.

In one aspect, disclosed herein is a computer-implemented method that involves: receiving input defining a validation point, the validation point comprising at least two or more validation functions applicable to (i) raw data and (ii) other data stored within a semantic network comprising nodes and links, importing source data; applying one or more transformations to the source data, populating the source data into one or more of the nodes and links comprising the semantic network, executing the validation point with respect the source data, based on the executing, determining that one or more rules associated with the validation point are not satisfied, and based on the determining, revising either the source data or the other data stored within the semantic network.

In yet another aspect, disclosed herein is a non-transitory computer-readable medium comprising program instructions that are executable to cause a computing system to carry out the operations disclosed herein, including but not limited to the operations of the foregoing method.

One of ordinary skill in the art will appreciate these as well as numerous other aspects in reading the following disclosure.

BRIEF DESCRIPTION OF THE DRAWINGS

FIG. 14 is an example of a master node and master link, according to one embodiment.

FIG. 21 depicts an example set of data that may be populated into a semantic network in accordance with an embodiment of the present disclosure.

DETAILED DESCRIPTION

The following disclosure references the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

Example System Architecture

Figure 1A:
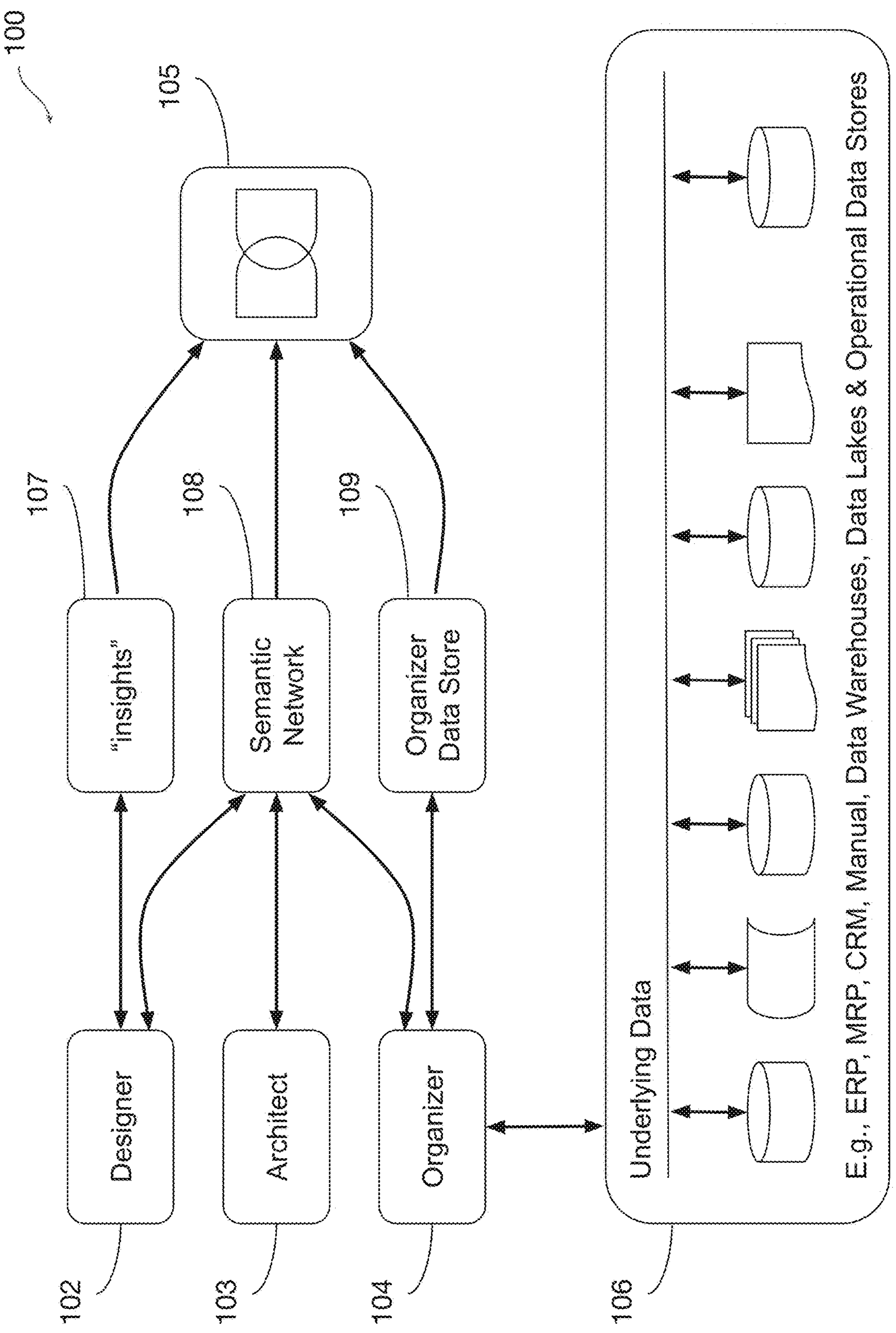
FIG. 1A depicts an example high-level functional arrangement in which example embodiments may be implemented.

Turning now to the figures, FIG. 1A depicts a high-level arrangement 100 of some of the functional components that may be involved in establishing, navigating through, facilitating data security operations for, validating the data of a digital duplicate and/or utilizing a master network to validate a digital duplicate. In one example, three different tools may be used to establish, navigate through various parts of, facilitate data security operations for, and utilize a master network to validate a digital duplicate 105, namely a designer tool 102, an architect tool 103, and an organizer tool 104, among other possible tools. At a high level, the architect tool 103 may be used to establish what is referred to herein as a "digital context," which can be thought of as the framework that replicates the language of a business. More particularly, but still by way of example, the architect tool 103 may be used to establish a "semantic network" 108 that relates the terminology and conceptual meanings behind the data collected and stored by an organization, such as various terms, metrics, key performance indicators, etc. that will be used within the digital replica of the business. As will be described further herein, the semantic network 108 may be a dynamic network of various data structures that are linked together, which replaces the typical relational data model of rows and columns contained within disparate databases, and which provides cross-functional visibility. A semantic network 108 may comprise nodes, links, and properties that represent core-business elements, and is the foundation of the digital context.

A designer tool 102 may be used to introduce business logic into the semantic network by creating "insights" 107 that traverse the network through one or more "pathways." The insights 107 may then be used as a basis for information and visualizations provided to end users in one or more forms. The insights 107 may be created at the semantic level, and may thus be abstracted away from underlying data 106.

An organizer tool 104 may be used to make a connection between the semantic network 108 and the organization's underlying data 106 (which, as depicted, may span across multiple disparate traditional databases or other data warehouses). This functionality may, in some embodiments, include functionality to link multiple data sources to the semantic network 108, as well as onboard the underlying data from the organization's underlying data 106 to the organizer data store 109, and ultimately into the semantic network 108 after filtering, cleaning, transforming, and/or validating the data as desired. These actions may serve to provide the system with what is referred to as "digital content," which together with the "digital context" form what is referred to as a "digital duplicate." Further examples of the architect tool, designer tool, and organizer tool, among other possible tools, are set forth in co-owned U.S. patent application Ser. No. 16/544,701, filed on Aug. 19, 2019 and titled "Processes and Systems for Onboarding Data for a Digital Duplicate," the entire contents of which are incorporated by reference herein for all purposes.

Another tool may be used to implement data security operations for semantic networks referred to as an admin tool. In particular, and as described further herein below, an admin tool may facilitate the creation of subsets of a semantic network such that visualizations of the subset of the semantic network restrict or hide portions of the semantic network not included in the subset. Additionally, the admin tool may facilitate establishing blocks and/or filters for a semantic network, such that visualizations of the semantic network either block selected portions of the semantic network and/or only show the selected portions of the semantic network. Such operations may be applicable when it is desired to present visualizations of the semantic network to particular users but restrict from these users view certain portions of the semantic network, including the underlying data (i.e., the digital content) assigned to the semantic network. As mentioned, this functionality may be embodied in an admin tool, which may in turn be embodied as a software tool configured to be executed by the example system architecture described further herein below. Additionally, the admin tool may facilitate the formation of and/or modification of master nodes and links of a master network.

Figure 1B:
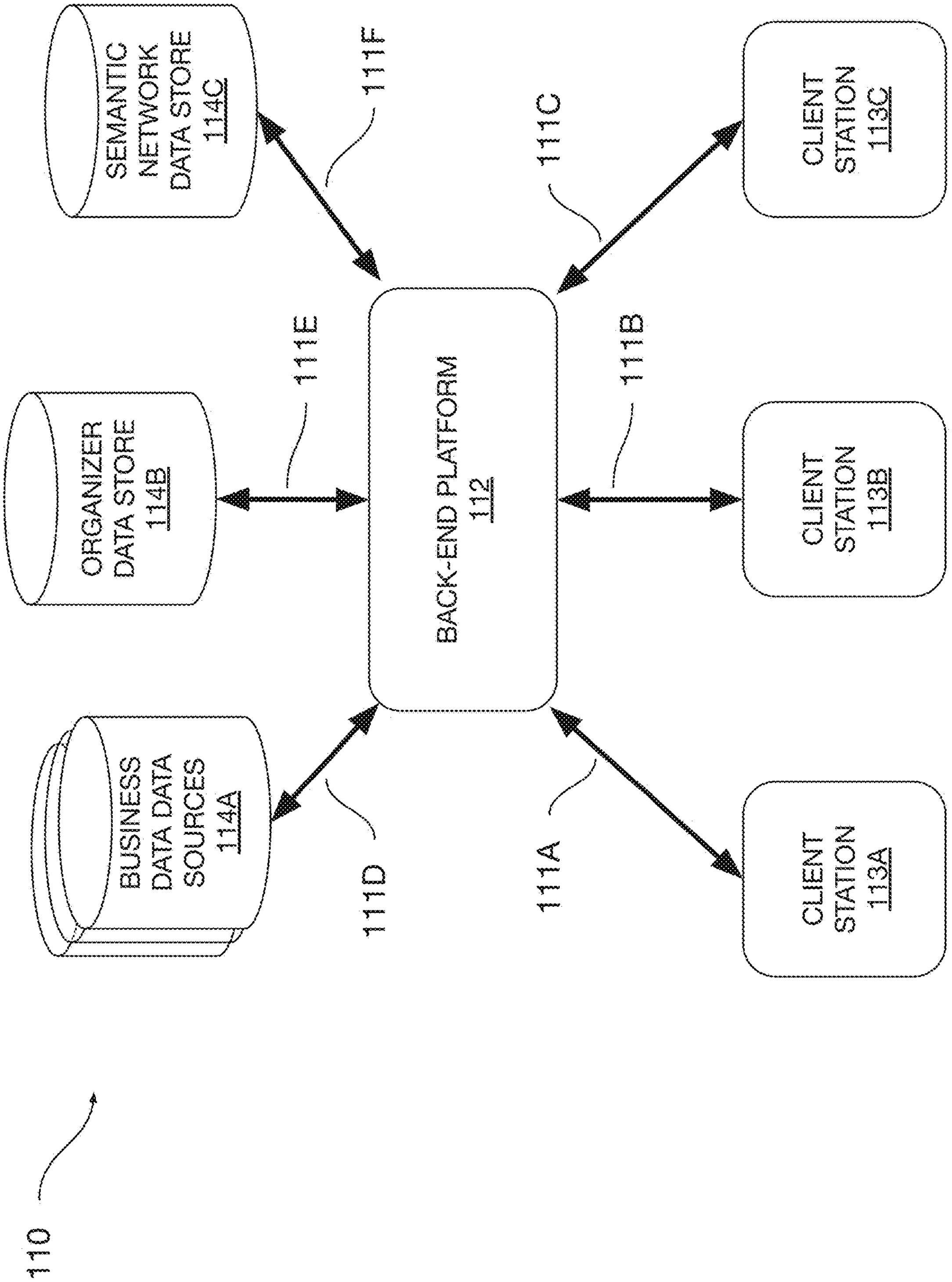
FIG. 1B depicts an example network architecture in which example embodiments may be implemented.

Turning now to FIG. 1B, depicted herein is an example network configuration 110 in which example embodiments of the present disclosure may be implemented. As shown in FIG. 1B, network configuration 110 includes a back-end platform 112 that may be communicatively coupled to one or more client stations, depicted here, for the sake of discussion, as client stations 113.

Broadly speaking, back-end platform 112 may comprise one or more computing systems that have been provisioned with software for carrying out one or more of the functions disclosed herein, including but not limited to establishing a digital context and ingesting data to form a digital duplicate. The one or more computing systems of back-end platform 112 may take various forms and be arranged in various manners.

For instance, as one possibility, back-end platform 112 may comprise a computing infrastructure of a public, private, and/or hybrid cloud (e.g., computing and/or storage clusters) that has been provisioned with software for carrying out one or more of the functions disclosed herein. In this respect, an entity that owns and operates back-end platform 112 may either supply its own cloud infrastructure or may obtain the cloud infrastructure from a third-party provider of "on demand" computing resources, such as Amazon Web Services (AWS) or the like. As another possibility, back-end platform 112 may comprise one or more dedicated servers that have been provisioned with software for carrying out one or more of the functions disclosed herein. Other implementations of back-end platform 112 are possible as well.

In turn, client stations 113 may each be any computing device that is capable of running the front-end software disclosed herein. In this respect, client stations 113 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 113 may each take the form of a desktop computer, a laptop, a netbook, a tablet, a smartphone, and/or a personal digital assistant (PDA), among other possibilities.

As further depicted in FIG. 1B, back-end platform 112 is configured to interact with client stations 113 over respective communication paths 111. In this respect, each communication path 111 between back-end platform 112 and one of client stations 113 may generally comprise one or more communication networks and/or communications links, which may take any of various forms. For instance, each respective communication path 111 with back-end platform 112 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 111 with back-end platform 112 may be wireless, wired, or some combination thereof, and may carry data according to any of various different communication protocols. Although not shown, the respective communication paths 111 between client stations 113 and back-end platform 112 may also include one or more intermediate systems. For example, it is possible that back-end platform 112 may communicate with a given client station 113 via one or more intermediary systems, such as a host server (not shown). Many other configurations are also possible.

The interaction between client stations 113 and back-end platform 112 may take various forms. As one possibility, client stations 113 may send certain user input related to a digital duplicate to back-end platform 112, which may in turn trigger back-end platform 112 to take one or more actions based on the user input. As another possibility, client stations 113 may send a request to back-end platform 112 for certain data and/or a certain front-end software module, and client stations 113 may then receive digital duplicate data (and perhaps related instructions) from back-end platform 112 in response to such a request. As yet another possibility, back-end platform 112 may be configured to "push" certain types of digital duplicate data to client stations 113, in which case client stations 113 may receive digital duplicate data (and perhaps related instructions) from back-end platform 112 in this manner. As still another possibility, back-end platform 112 may be configured to make certain types of digital duplicate data available via an API, a service, or the like, in which case client stations 113 may receive data from back-end platform 112 by accessing such an API or subscribing to such a service. The interaction between client stations 113 and back-end platform 112 may take various other forms as well.

As also shown in FIG. 1B, back-end platform 112 may also be configured to communicate with one or more data sources 114 (e.g., 114A-C as shown in FIG. 1B), such as external databases, internal databases, and/or another back-end platform or platforms. Such data sources—and the data output by such data sources—may take various forms. Further, back-end platform 112 and the one or more external data sources 114 may be configured to interact over a communication path 111, which may take the form or forms discussed above with respect to the other communication paths 111.

It should be understood that network configuration 110 is one example of a network configuration in which embodiments described herein may be implemented. Numerous other arrangements are possible and contemplated herein. For instance, other network configurations may include additional components not pictured and/or more or less of the pictured components.

Example Computing Device

Figure 2:
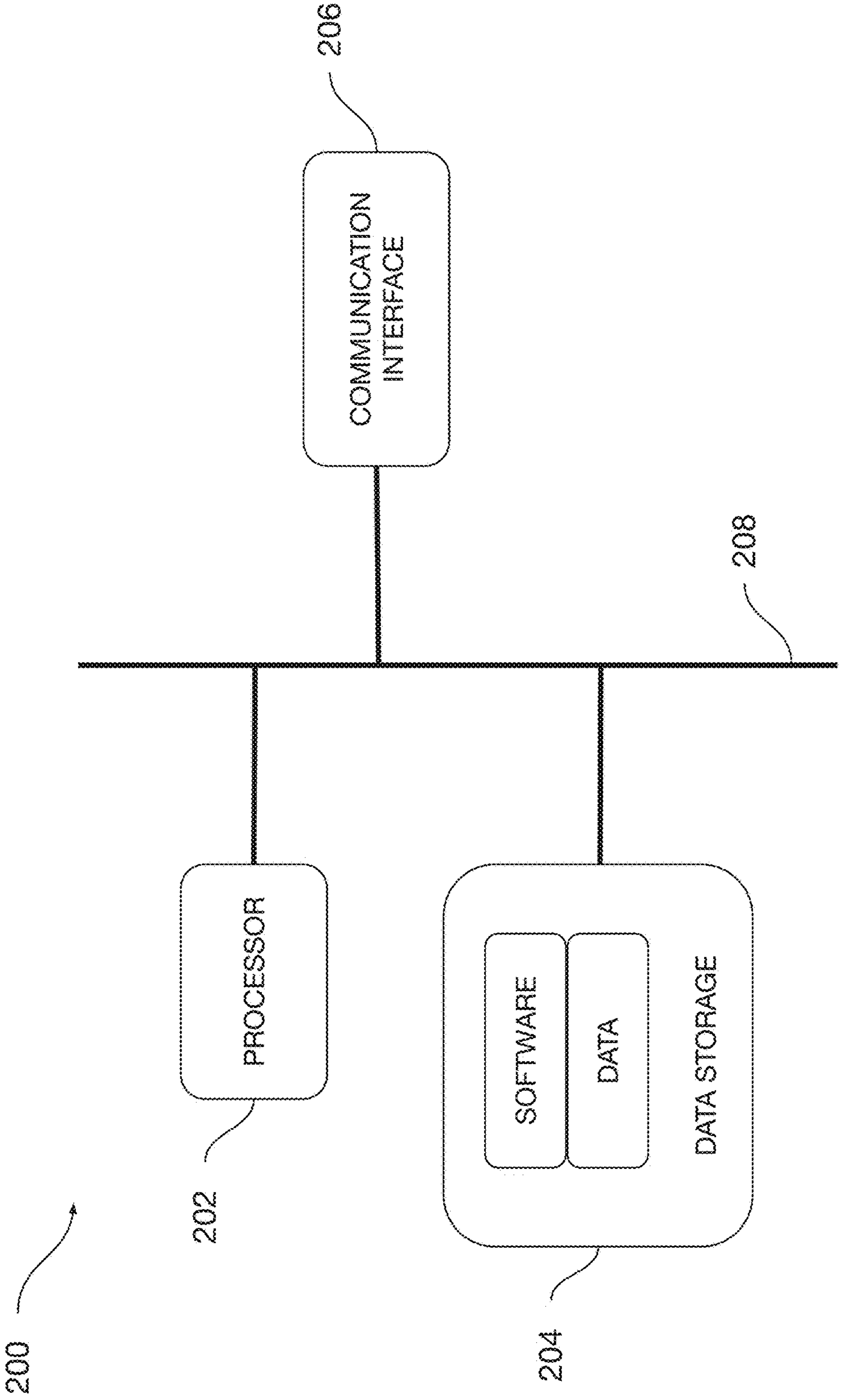
FIG. 2 depicts a simplified block diagram of an example computing device in which example embodiments may be implemented.

FIG. 2 is a simplified block diagram illustrating some structural components that may be included in an example computing device 200, which could serve as, for instance, the back-end platform 112 and/or one or more of client stations 113 in FIG. 1B. In line with the discussion above, computing device 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the computing device 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store data in one or more databases, file systems, or the like. Data storage 204 may take other forms and/or store data in other manners as well.

Communication interface 206 may be configured to facilitate wireless and/or wired communication with other computing devices or systems, such as one or more client stations 113 when computing device 200 serves as back-end platform 112, or as back-end platform 112 when computing device 200 serves as one of client stations 113. As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing device 200 may additionally include one or more other interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing device 200.

It should be understood that computing device 200 is one example of a computing device that may be used with the embodiments described herein. Numerous other arrangements are possible and contemplated herein. For instance, other computing devices may include additional components not pictured and/or more or fewer of the pictured components.

Digital Duplicate Data Structures

As mentioned, the present disclosure is directed to a new approach for structuring an organization's, a business's, or a network's data as well as processes for implementing data security and data verification operations within this approach, all of which may help to facilitate more efficient access to this data. At a high level, this approach involves establishing a digital context and populating the digital context with digital content to thereby form what is referred to herein as a digital duplicate. Deploying a digital duplicate in practice includes the high-level steps of first creating the digital context, and second adding data to this digital context. The digital duplicate may be kept live or refreshed repeatedly over time by continuously updating the digital context as the organization's, business's, or network's data changes and the digital content as the data and the data sources change. While elements of the digital context and digital content may change, the core data structure of the digital duplicate does not typically change, allowing the information to remain consistent without having to change the design of the data structure.

Furthermore, a digital context that is developed for one organization, business, or entity within an industry may be applied (at least partially) to a second organization, business, or entity within a similar industry since common semantics may be used to describe an organization, business, or entity within an industry. Similarly, "insights" and verification constructs that are created at the semantic level may also have overlap between organizations, businesses, and/or entities within similar industries, and once created for a first organization, business, and/or entity may be applied (at least partially) to a second organization, business, and/or entity. This is an advantage of building a semantic network and developing "insights" and verification constructs at the semantic level.

Figure 3:
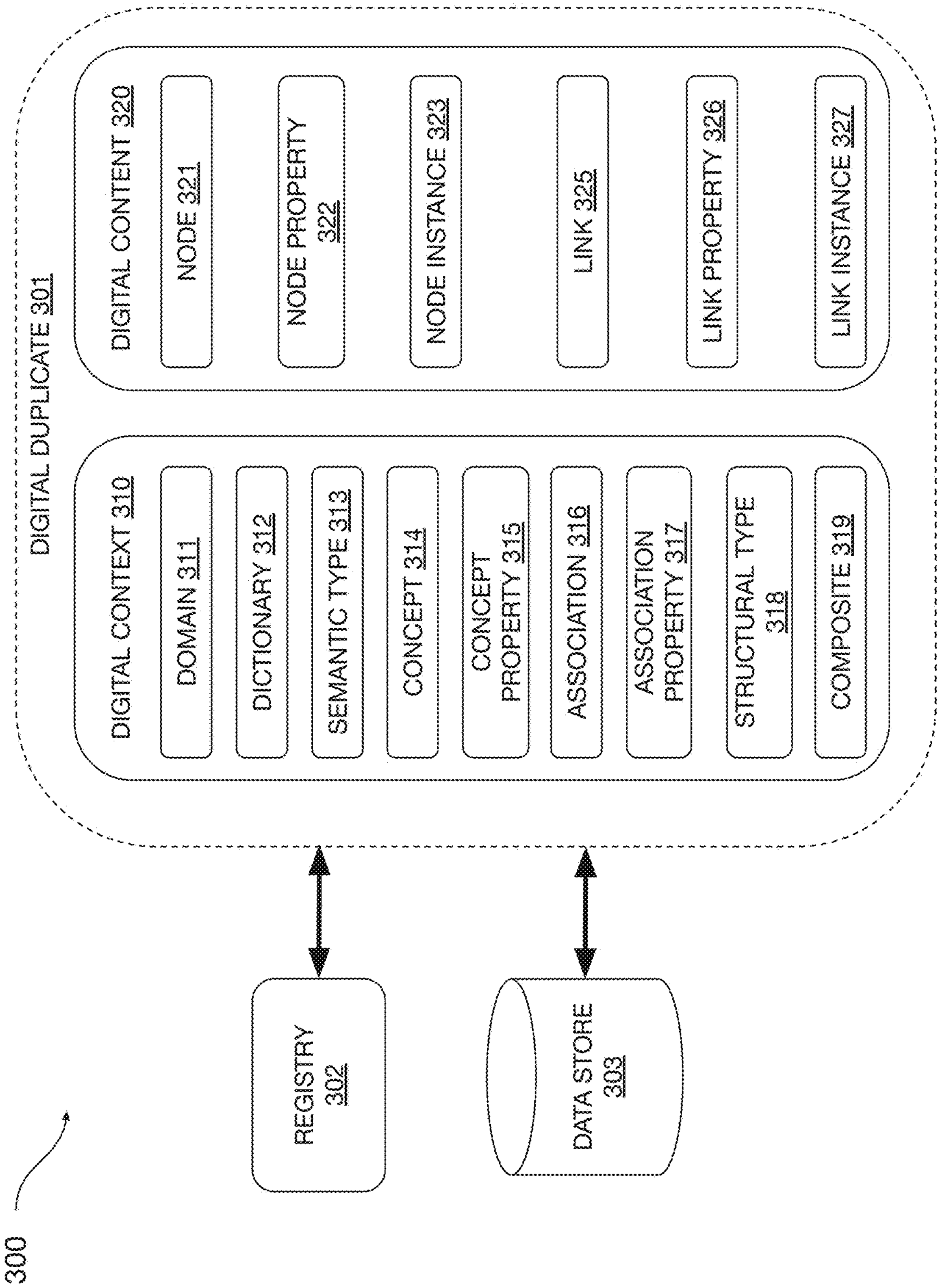
FIG. 3 depicts a simplified block diagram of some example data structures according to example embodiments.

FIG. 3 is a simplified block diagram, illustrating an example digital duplicate data structure architecture 300 according to an example embodiment of the present disclosure. At a high level, and as depicted, digital duplicate data structures 300 may include a digital context 310 and digital content 320, which together form what is referred to herein as an instance of a digital duplicate 301. The data structures 300 also include a registry 302 and a data store 303. These various data structures are described herein in further detail.

Digital Context

At a more specific level, but still by way of example, FIG. 3 depicts an example architecture diagram illustrating certain data structures included within digital context 310. As mentioned, digital context 310 is a data structure that generally comprises a network of individual data components. This network of data components may include structural context components and semantic context components. These components may be stored in a data store as will be described further herein.

Turning first to the structural context components, these structural context components may generally describe how the data is structured and stored in the digital context. In one implementation, the structural context components may include conceptual components 314 (sometimes referred to herein as concepts and/or nodes of a semantic network) and associative components 316 (sometimes referred to herein as associations and/or links of a semantic network). And these components may have one or more respective properties 315, 317. These components may be designed to hold data that describes various aspects about how an organization's information is structured within the digital duplicate 301 as well as how this information relates to itself. Although these components are depicted as blocks in a simplified block diagram, it should be understood that the underlying data represented by these blocks may be stored in an appropriate storage location of data store 303, which may at time be referred to herein as a directory.

Figure 4:
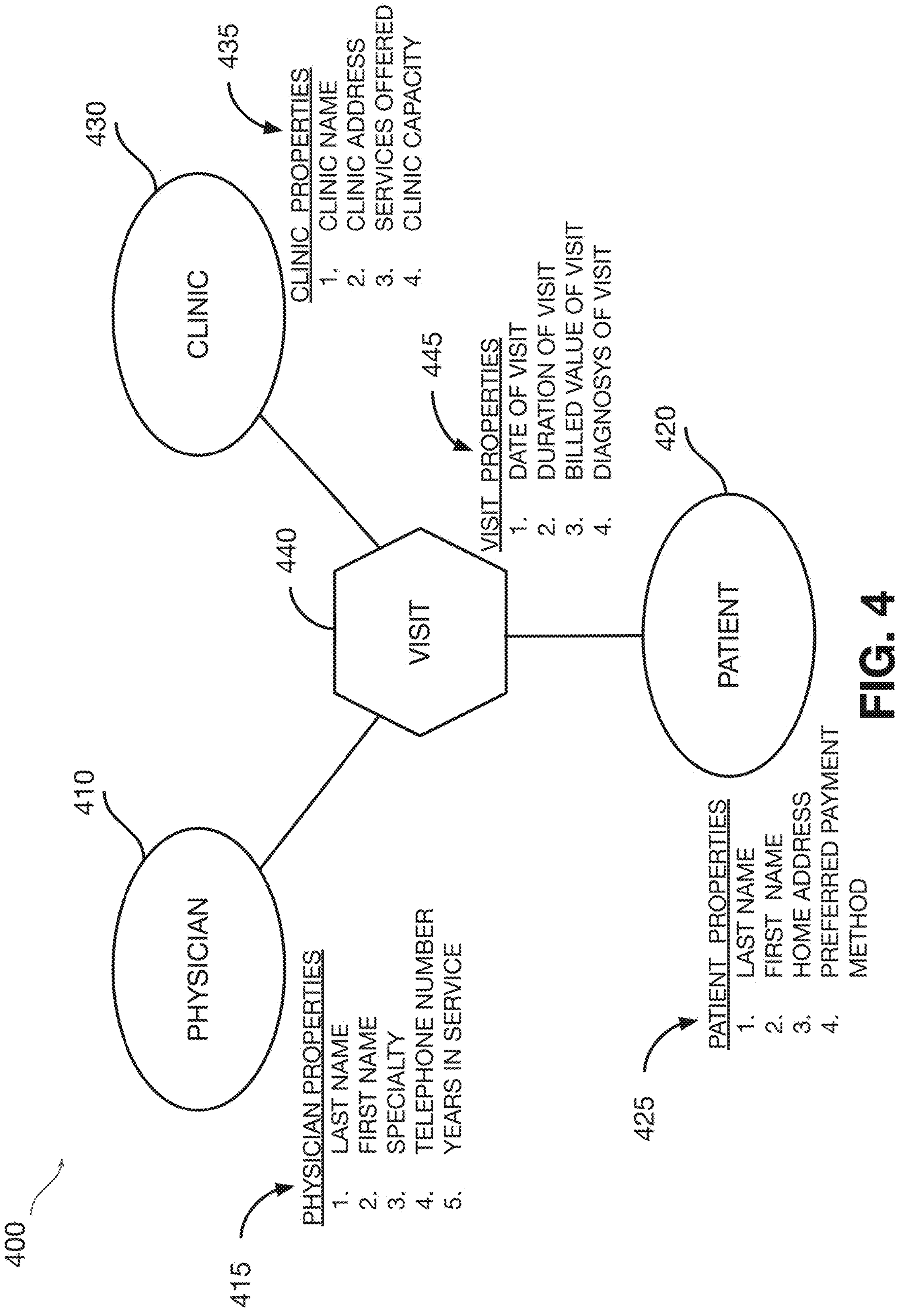
FIG. 4 depicts an example portion of a semantic network in which example embodiments may be implemented.

A conceptual component 314 may generally be a data structure that is designed to hold data that describes one aspect of an organization's business. FIG. 4 depicts a portion of an example semantic network 400 for a particular organization in the medical services industry. One example conceptual component may be a "physician" component 410 which may be designed to hold data that describes the physicians that are employed by the particular organization. To this end, the "physician" conceptual component 410 may include various physician properties 415 for holding such data, including a "Last Name" property, a "First Name" property, a "Specialty" property, a "Telephone Number" property, and/or a "Years in Service" property, among other examples.

In some cases, properties may be shared across multiple conceptual components. For example, the "specialty" property may be shared across multiple "Physician" conceptual components 410 and/or the "Clinic" conceptual component 430. In situations in which a property is widely shared across multiple conceptual components, the digital context may be configured to promote the "specialty" property from a property to a separate concept. This may be accomplished without changing the underlying data structure but rather reconfiguring it. This ability of the neuro-semantic network to adapt and learn as the organization changes makes it a scalable and learning model. The method provides for the ability to promote properties into concepts or to collapse them into concepts and associations to best represent the current structure of the organization.

Another example conceptual component 314 may be a "patient" component 420 where this conceptual component may be designed to hold data that describes the individuals that are patients of the various physicians who are employed by the particular organization. To this end, the "patient" conceptual component 420 may include various patient properties 425 for holding such data, including a "Last Name" property, a "First Name" property, a "Home Address" property, and/or a "Preferred Payment Method" property, among other examples.

Yet another example conceptual component 314 may be a "clinic" component 430 where this conceptual component may be designed to hold data that describes the various clinical facilities utilized by the particular organization. To this end, the "clinic" conceptual component 430 may include various clinic properties 435 for holding such data, including a "Clinic Name" property, a "Clinic Address" property, a "Services Offered" property, and/or a "Clinic Capacity" property, among other examples.

As depicted, another type of structural component of the digital context may be an associative component 316. An associative component is similar to a structural component in that it is designed to hold data that describes one aspect of an organization, business, and/or entity. But more specifically, the associative component is also designed to hold data that (i) describes an aspect of the organization, business, and/or entity such as an activity or a metric and (ii) relates together to two or more conceptual components 314. One example associative component for the particular organization in the medical services industry may be a "visit" component 440 designed to hold data that describes a particular patient's visit to a particular physician at a particular clinic and is thus associative of multiple conceptual components, including the example "physician" 410, "patient" 420 and "clinic" 430 structural components described above. To this end, the "visit" associative component 440 may include various properties 445, including a "Date of Visit" property, a "Duration of Visit" property, "Billed Value of Visit," and/or a "Diagnosis of Visit" property, among other examples.

As mentioned throughout the examples given above, structural context components, including both conceptual components and associative components, include various properties 315 (e.g., physician properties 415, patient properties 425, and clinic properties 435 of FIG. 4), 317 (e.g., visit properties 445 of FIG. 4) for holding certain specific descriptive data for the structural context component. In some implementations, each individual property of a given structural context component may be described by a particular combination of a structural data type 318 and a semantic data type 313, which may thus form a semantic component.

Generally, a structural data type 318 applied to information is data that describes how the information is stored within the system. Many different structural data types are possible. As one example, a structural data type may take the form of a "temporal" data type, under which a "Years in Service" property may fall. As another example, a structural data type may take the form of a "spatial" data type, under which a "Clinic Address" property may fall. As another example, a structural data type may take the form of a "physical" data type, under which a "Clinic" and the "Clinic Name" property may fall. As another example, a structural data type may take the form of a "Personal" data type, under which a "Last Name" data type may fall. As another example, a structural data type may take the form of a "Quantitative" data type, under which a "Billed Value of Visit" property may fall. As another example, a structural data type may take the form of a "Categorical" data type, under which a "Specialty" property may fall. It should be appreciated that other examples may be possible as well.

Generally, a structural data type helps define how data is managed, indexed, and stored for all similar properties in the network. Properties with common structural data type may use common data structures to store and retrieve data across a digital duplicate and provide an efficient way to store, access and relate data; allowing for unique computations; and provide better methods to access, resolve and compare similar data. For example, all "temporal" data types may share or "index" to a common timeline data structure that allows independent events like a sale event and a marketing discount that happened during the same month without having to explicitly compare data. This provides an ability to not only perform unique computations and analysis on properties with similar structural data like "same month," or "same quarter," but also compare financial results of two unrelated companies for the same quarter even though they may belong to different business networks because they use the same temporal data type. In another case, if two separate networks provide the population and economic data for the same spatial data type (such as a zip code), it allows one to overlay and contrast population and GDP for the same zip code with minimal effort. Multiple similar storage and advantages can be added to across all shared structural data types by creating a shared structural data type and storage model across properties in a network.

Structural data types like "temporal," "spatial," "personal," or "organizational" may allow data and methods to be shared across one or more properties in a network or across whole networks using a common data structure like a shared timeline, time resolution, or temporal methods; while semantic data types (discussed below) allows for data and methods to be shared across a network using common meaning. Shared structural data types may also have shared resolution and absolute values. For instance, "February 2015" will have a resolution of 1 day and may be a delivery date to a customer or the start date of an employee. This allows shared computations like "Start Month" or "Delivery Month" to be performed.

As also indicated, each property may also have a semantic data type 313. Generally, a semantic data type applied to underlying information is data that describes what the information means. A semantic data type may have various aspects that facilitate describing what the information means. One aspect that a semantic data type may have is called a primitive data type. A primitive data type may describe the general form of the information. Example primitive data types may include "integer," "Boolean," "string," "float," etc. Another aspect that a semantic data type may have is a pointer that points to a particular function that may be associated with the information. This pointer may be stored in the dictionary entry 312 for the particular semantic data type and may point to various kinds of functionality. As one example, the pointer may point to a web method for utilizing the underlying information. A web method may be any operation or set of operations embodied in a web service, API, or the like. For instance, one web method may be a "mailto: EmailAddress" web method that refers to a web method that causes an email client to be invoked, generate a new email message, and populate the "To:" field with the email address represented by the data variable "EmailAddress." Other web methods are possible as well.

Another example of a function to which a pointer may point is mathematical operation performed using the underlying information represented by the semantic data type. For instance, one type of mathematical operation for a "date of birth" semantic data type may be an age computation function. With such a function, the system may compute the age of an individual represented by the underlying date of birth information by, for instance subtracting the "date of birth" date from "current date" data to arrive at "age" data.

Another type of mathematical function for a "price per unit" semantic data type may be a total price aggregation function. With such a function, the system may aggregate all of the data values from various "price per unit" data types to arrive at a total price value. Such a function may be useful in situations where a customer is purchasing products or services in a single order that stems from two or more aspects of a business, which may not have aggregated their data systems in advance. Applying the "price per unit" semantic data type (or, in other examples, a similar-functioning semantic data type) serves to link the pricing across what may be disparate aspects of the organization and/or disparate data systems.

Another type of mathematical function for a "lead time" semantic data type may be a lead time aggregation function. A "lead time" semantic data type may be associated with a product, component of a product, subassembly, construction project, etc. With such a function, when a customer purchases multiple products at once, an aggregation function may be executed in which the system may automatically populate "lead time" data by selecting the individual lead time field for each of the purchased products that has the greatest lead time value. In cases in which a product may not have a lead time associated with it, the lead time of each subassembly or component that makes up the product may be summed to approximate the total lead time of the product.

In one example, during data ingestion, the system may capture various data fields for an order, including a "deliveryDate" field for describing the delivery date of an order, an "orderDate" field for describing the date of the placement of the order, and a "deliveryTime" field for describing the time taken for the order to be fulfilled after the product is fully manufactured and stocked in inventory, all of which may be specified by various a logistics or fulfillment systems. At this stage, the system may compute the actual lead time of the product to be the function of (deliveryDate−orderDate)−deliveryTime. Therefore, in the case where a product is not built before it is ordered (as is common in the heavy equipment industry, for example) lead time may be a residual value, as calculated above. Once lead time is known, the system may then engage in a function that compares the actual lead time with the approximated lead time, which may be made possible by the existence the "lead time" semantic data type being used across multiple business systems that is semantically distinct from a "delivery time" type. A further function may add an "error" to the function for computation of approximated lead times for all other products, which in turn may propagate the new calculation of approximated lead times throughout the digital duplicate instantaneously. In this way, the system may engage in a kind of machine learning.

Another example of a function to which a pointer may point is a linking function that may operate to link two or more semantic data types together and form a new property of an associative structural component. As one example of this, a distance function may link together an "address" property of a "patient" conceptual component and an "address" property of a "clinic" conceptual component and computes the distance between these two addresses. The function may then save this distance as a new property of a new associative component.

Yet another example of a function to which a pointer may point is a semantic search function. With such a function, a search may be executed on a given semantic data type, which may retrieve data of the same semantic type from other areas of the organization or other network.

To help illustrate, consider an example in which respective digital duplicates have been established for different aspects of an organization. Each such digital duplicate will have its own set of data components stored separately from the data components of the other digital duplicates. In a situation in which a user desires to know all employees that share duties or interact across the organization's departments, a semantic query can be issued on an "Employee" semantic data type. In the context of the present disclosure, such a semantic search may return all data objects that are based on this semantic type, regardless of the content, format, or location of the data. In this way, the semantic search unifies various disconnected digital representations. With conventional approaches, by contrast, a typical search would fail here, because the data may be spread out across multiple different databases and arranged in multiple tables; and as such, any query would need to account for these multiple databases and the various tables.

Considering another example, say a user desires to know all entities (e.g., dealers, customers, vendors, employees, etc.) having a specific area code. In the context of the present disclosure, the user could issue a single query on a "Phone No." data type for the specific area code of interest. Such a query would return all data objects having the specific area code of interest no matter the location or format of the data. By contrast, with a conventional approach, a user may need a deep understanding of the organization's data storage structure in order to carry out this query. For instance, the user may need to know what table the employee records are stored in and what field and what format the phone number data is stored in. Likewise, the user may need to know this same information for the dealer records, the customer records, the vendor records, etc. Each additional storage location may add complexity to the query. And to the extent that the data is stored in disparate data stores (such as one data warehouse for employee records and another data warehouse for vendor records), then the user may need to issue separate queries for each such disparate data source further compounding the complexity and vulnerability for user error. Thus, with the benefit of the present disclosure, it should be understood how the semantic data type provides for more efficient data retrieval, among other advantages.

In some embodiments, user interface elements presented by one or more computing devices disclosed herein (e.g., client stations 113) may reflect semantic data types with specific graphical elements, such as icons. As one example, on a user interface that is displaying multiple semantic data types for an organization, the user interface may display a telephone icon adjacent to data that is of a "phone number" semantic data type, and/or a map icon if the data is of an "address" semantic data type, although other examples are possible. It should be understood that the functions disclosed herein are merely examples, and that in other implementations, other functions may be possible as well.

Depending on the organization, semantic data types can be arranged into various semantic groups. A semantic group is generally a set of one or more semantic data types that are relevant to a particular categorical aspect of the organization. For instance, example semantic groups for an organization may be "Financial & Accounting," "Production & Manufacturing," "Purchasing," and/or "Logistics." In this way, an organization may arrange the semantic data types into groups that are reflective of the organization's operating departments or sectors. Thus, the "Financial & Accounting," semantic group may have semantic data types that refer to aspects of the organization's own financial & accounting department, the "Production & Manufacturing," semantic group may have semantic data types that refer to the aspects of the organization's own production and manufacturing operations, etc. As such, these semantic data types may more accurately describe the organization's own business operations and may thus be more useful to the organization.

Semantic data types may provide various advantages to organizations who utilize the digital duplicate schema set forth in FIG. 3 and generally described herein. As one advantage, the semantic data type 313 may serve to discriminate between (i) human language used to describe an aspect of the organization's operations (which can be stored as the name of a property, in one embodiment) and (ii) the underlying meaning of the human language used to describe the aspect of the organization's operations (which can be stored as the semantic data type, in one embodiment). This discrimination may thus allow for properties in the digital duplicate to be unified by their underlying meaning (i.e., unified by their semantic data type) even when the human language used to describe them (i.e., their property names) may not be the same.

More particularly, but still by way of example, the digital duplicate architecture 300 encourages this unification by having data sets that are consistently accurate and complete because no data is mismatched within a given context. To illustrate, if one property is called "Digits," and another property is called "Phone No." but these properties refer to the same thing, they both may be pulled into a report, a visualization, a computation, or used in some other way by the computing system when the digital duplicate calls for the semantic data type 'Telephone Number' within a given context. This may be accomplished through an arrangement where "Telephone Number" is a semantic data type that is shared by both the "Digits" and "Phone No." properties. In this way, the semantic data type may be said to "unify" two (or more) properties by these properties' underlying meanings.

Unification may also allow for functions to be associated with different properties of the same semantic data type. To illustrate, as indicated above, "Digits" and "Phone No." may be two different properties that share the same semantic data type "Telephone Number." Therefore, both "Digits" and "Phone No." may have a pointer that points to a "Make-Call" function, which is assigned to these properties by virtue of their shared semantic data type.

Unification may also occur by enriching the structural context of the digital duplicate as a result of automating through-computation of additional properties based on the semantic data type(s) of the original properties and the functions available for the semantic data type(s). To illustrate using the example from above, the function for computing "Age" from the "Date of Birth" semantic data type is a form of unification because "Birth Date" and "Date of Birth" may be distinct properties in the digital duplicate but share the same semantic data type: "Date of Birth." Other examples of how the digital duplicate architecture results in unification are possible as well. The combination of the concept (node) or association (link) that describes a property in combination with a semantic data type (and in many cases a structural data type) individually and combined also create a strong representation of the digital context. When combined, they provide not only a simple way to locate every piece of data in the semantic network, and to locate a relative position of the data to other pieces of data for navigation and comparison, but also may provide meaning to the data and structure for storage. Once combined, these data structures create ways to simply and efficiently create, manage, and navigate data in a business or network using the digital context.

As also depicted in FIG. 3, digital context 310 may contain a composite structure 319. A composite structure 319 may contain one or more indications of sets of concepts and associations that represent various aspects of an organization. One type of composite structure may be a layer of concepts and associations. The concepts and associations that comprise a layer may represent similar aspects of the organization. In one example, an organization in the medical services industry may have a "pharmaceutical" layer that comprises concepts and associations related to any pharmaceutical aspects of the organization, such as pharmacy employees, pharmacy inventories, and/or an employee layer that comprises concepts and associations related to employees across all departments. Another type of composite structure may be a realm of concepts and associations. The concepts and associations that comprise a realm may represent aspects of the organization that are grouped on a broader level. For instance, a large organization that is made up of or owns several smaller businesses may have a realm that comprises all the concepts and associations for one entire business and a realm that comprises all the concepts and associations for another entire business. Yet another type of composite structure may be an insight. The concepts and associations that comprise an insight may represent collections of concepts and insights that have been automatically identified by the system as having some threshold number of relationships. The system may identify such insights when certain patterns develop in the organization's digital context (e.g., a threshold number of associations between various concepts, and/or a threshold number of shared properties between multiple concepts or associations), and in this may be identify to users unique aspects of the organization's operations. Other examples of layers, realms, and insights are possible as are other types of composite structures.

Digital Content

As also depicted in FIG. 3, the digital duplicate 301 includes digital content 320. Generally, digital content 320 is the underlying data that populates one or more instances of the framework for the digital duplicate (i.e., the digital context 310) described above. Such digital content may comprise data that may be ingested into the system (in accordance with, perhaps, the functionality associated with the organizer software tool described further herein below) from one or more data sources, such as business systems (e.g. CRM systems, ERP systems, POS systems, accounting software, etc.), enterprise data stores, data warehouses, data lakes, operational data stores, as well as any other type of kind of databases or data store, such as data inputted by a user, data mined from research reports, among other examples (including, for instance, underlying data 106 in FIG. 1A).

This underlying data may be either static data, data updated in a batched manner, such as on a periodic or aperiodic refresh cycle, or data updated in real-time or near real-time (e.g., data provided to the system in the form of a data "stream", which may or may not be buffered to align with the update frequency of the Digital Duplicate's data ingestion method). Other examples of data ingestion may be possible as well.

As depicted, digital content may generally be comprised of links and nodes. In particular digital content 320 may include node data 321, node properties 322, and node instances 323. Further, digital content 320 may also include link data 325, link properties 326, and link instances 327.

As a general matter, node data 321 and link data 325 may include underlying instances of an organization's information that populates a digital context schema, examples of which have been described above. Node data 321 in particular may include the underlying information that populates the conceptual components of the digital context. Referring back to the examples described above, one example conceptual component may be a "physician" component where this conceptual component may be designed to hold data that describes the physicians that are employed by a particular medical services organization. Node data 321 may thus include underlying organization information for the "physician" component, such as individual instances 323 of particular physician information. Thus, for each instance of information that populates the "physician" conceptual component, node data 321 may include a corresponding node. The underlying information within each respective node may be arranged into node properties 322 in accordance with the property structure defined by the conceptual component. For instance, one "physician" node may include node property data "Smith" for the "Last Name" property of the conceptual component, "John" for the "First Name" property of the conceptual component, "Pediatrics" for the "Specialty" property of the conceptual component, "555-867-5309" for the "Telephone Number" property of the conceptual component, and "30" for the "Years in Service" property of the conceptual component, although other examples are possible.

Similarly, link data 325 may include the underlying information that populates the associative components of the digital context. Referring back to the examples described above, one example associative component may be a "visit" component where this associative component may be designed to hold data that describes a particular patient's visit to a particular physician at a particular clinic. Link data 325 may thus include underlying organization information for the "visit" component, such as individual instances 327 of particular visit information. Thus, for each instance of information that populates the "visit" associative component, link data 325 may include a corresponding link. The underlying information within each respective link may be arranged into link properties 326 in accordance with the property structure defined by the associative component. For instance, one "visit" link may include link property data "Jan. 2, 2020" for the "Visit Date" property of the associative component, "1 hour" for the "Duration of Visit" property of the associative component, and "$110" for the "Billed Value" property of the conceptual component, although other examples are possible.

Storage Schema

The network of individual data components described above may be stored in one or more data stores 303 in various ways. The structure of the digital context and well as the storage schema, as described herein, allows for network traversal as well as semantic searches (described above) while querying for data. As a result of traversal of the "data network," subsets of the data can be efficiently retrieved and presented to one or more users. Data stores 303 may take the form of one or more of SQL Server, Oracle, Mongo DB, or other storage technologies.

As one example of the various ways in which the individual data components may be stored in data stores 303, relationships between conceptual components 314 and associative components 316 may be stored using what are referred to as unique identifiers ("UIDs"). In this way, each element of each instance of the digital duplicate 301 may have an associated UID (which, depending on the situation, may or may not be unique). As outlined above, the various elements that may have a UID assigned thereto may be (i) domains, (ii) subdomains, (iii) directories, (iv) conceptual components, (v) associative components, (vi) properties, (vii) dictionaries, (viii) semantic groups, and/or (ix) semantic data types. In some implementation, a UID may take the form of a URI (Uniform Resource Identifier), or any other standard identifier type, among other examples.

As an illustrative example the "Patient" conceptual component may exist in data storage 303 in, for instance, table form with underlying digital data populated for the component in the form of [P1, P2, P3, etc.]. Likewise, the "Physicians" conceptual component may exist in data storage 303 in, for instance, table form with underlying digital data populated for the component in the form of [H1, H2, H3, etc.]. Likewise, the "Clinics" conceptual component may exist in data storage in table form with underlying digital data populated for the component in the form of [C1, C2, C3, etc.].

Using this arrangement, the "Visits" associative component may accordingly exist in data storage 303 in, for instance, table form with underlying digital data populated for the associative component in the form of a table containing intersecting data from the other related conceptual components. As an example, one specific instance of the "Visit" component may have data that takes the form [P1, H3, C2], where this instance describes a visit that took place by patient "P1" who was treated by physician "H3" at clinic "C3," although other combinations are be possible.

Reciprocal data tables may be stored in data storage 303 as well. A reciprocal table may serve to identify, for the conceptual component data, whether and to what extent there is associative component data that relates in some way to the conceptual component data. Using the examples set forth above, the "Patient" conceptual component discussed above may contain a reciprocal table that intersects its dependent structural components for each instance of a "Patient," where one instance for Patient "P1" may take the form of [V1, H3, C2]. Other examples of reciprocal tables may be possible as well.

In this way, the data defining the schema for the digital duplicate may be embodied as a "data network" or form of neurosynaptic storage of information, where associative information (such as that described above) is stored at the intersection point of the structural components. Each instance of such data tables for corresponding "Visits," "Patients," "Physicians," and "Clinics" (as examples) may be created from source data by an organizer part of the data ingestion method, described below. This provides certain advantages over traditional data storage models, such as relational models that use fixed relationships between data. As one advantage, the present technique uses a single, atomic template to implement each structural association and its corresponding components in the appropriate storage model. As such, this technique allows for dynamic expansion to create as many associations as may be desired to represent the desired comprehensive network. In comparison to NoSQL databases that store entities as collection of key-value pairs and allow for each record to have a variable structure in each table, or graph databases that use key-value pairs to store relationships between two values, the digital duplicate architecture allows information to be stored within a flexible neurosynaptic data structure to describe the data using the directory, dictionary, and the structural data types. This provides dramatic flexibility both to store and locate data accurately and to capture additional business information within the network.

Further, the data defining the schema for the digital duplicate can be stored in data storage 303 via tables that represent all relationships that comprise the network of components (referred to herein as the "Digital Context" 301310). And in this way, data ingested can be placed within this digital context 301310. In some implementations, this technique may provide for traceability between data sources and its corresponding data context using UIDs for each source of data and for each contextual element. As an example of this, a patient's "First Name" data element may reference the UID of the structural elements corresponding to this data element (for example, the patient's associated visits) and vice-versa.

The system may be further configured to store a particular digital context 310 and/or the underlying digital content 320 for the particular digital context with an indication that the particular digital context and/or the underlying digital content belongs to unique domain 311 or subdomain. For instance, a unique domain (and/or subdomain) may be established for each instance of the digital duplicate and may be stored in a registry 302. A registry 302 may contain (a) a list of domains and (b) a list of all subdomains that exist within each domain. For instance, returning to the example organization in the medical services industry, the list of domains may contain a domain indicator (e.g., a URI) that is specific to this organization. The domain indicator may thus represent all the data that is stored as the digital content for a digital duplicate related to this organization. Within each domain, there may be one or more subdomains for individual data contexts for the organization. For instance, within the domain for the example organization, in the medical services industry, there may be a subdomain for "Purchasing," and a subdomain for "Marketing," among other examples. This, the list of subdomains may contain subdomain indicators (e.g., URIs) that identify these subdomains.

A registry 302 may also contain data describing locations and identifiers of authentication security services for users accessing data within a given domain. For instance, domains and subdomains may be private (accessible only to users within an organization), and as such may contain such authentication data that serves to describes the various user that have appropriate permissions to access the given domains and/or subdomains. Domains and subdomains may also be public, and therefore accessible to any users or systems outside of an organization. Other examples of data that may be stored in the registry are possible as well.

As explained, the schema for one instance of a digital context may be stored in or with what is referred to as a "dictionary" 312. In this way, a single dictionary 312 may store data that describes the digital context 310 for one specific organization. The system may thus store multiple dictionaries, with one dictionary being stored for each specific organization that utilizes the system to create and store an instance of a digital duplicate 301. In some implementations, however, dictionaries may be shared between domains and/or subdomains. For instance, if a first organization in the medical services industry has already established a dictionary that stores its schema data describing its digital context, then a second similar medical services organization may benefit from using this same dictionary already established for the first organization. In this way, a common set of semantics may be used across organizations in the same or similar industries.

The digital duplicate may be stored via data store 303 using any appropriate data storage technology, including by way of example, graphical databases, relational databases (SQL, Oracle), in-memory data storage, as well as other types of storage. Digital duplicate information may be stored in two or more such database technologies for redundancy and/or performance purposes.

In some implementations an index file may be used as a separation of concerns measure. For instance, an index file that may contain data keys may reside in one location and the digital duplicate data may reside in another, perhaps remote, location. In this way, a set of semantic services may be employed to store and retrieve data specific to the underlying digital duplicate data by first accessing the data keys and then using those data keys to identify and access the location of the underlying digital duplicate data.

Overview of Example Master Network

For the following, the term "source data" refers to data coming from various data stores or data sources in the raw format or in a transformed format. For example, raw stock ticker data coming from a web service may include the following: company name, stock ticker symbol, and price. An example transformation may be converting the ticker symbol to all upper case, among other possible transformations.

A master node definition includes a (i) name, (ii) "key" property, (iii) zero or more secondary properties. A master node instance stores data that is unique to what the master node represents. The master node also has data based on the structure or definition of the master node, which is called master data. As an example, master data can be used to validate the source data for a semantic node in the digital duplicate.

A master link definition includes a (i) name, and (ii) two or more connected master nodes. A master link instance stores data that is unique to the master link. This data is also referred to as master data. As an example, master link can be used to validate the source data for a semantic link in the digital duplicate.

A master network is a network of data from master nodes and master links. A master network can be used to validate source data (i.e., data that is imported or updated) for a semantic network.

Figure 5:
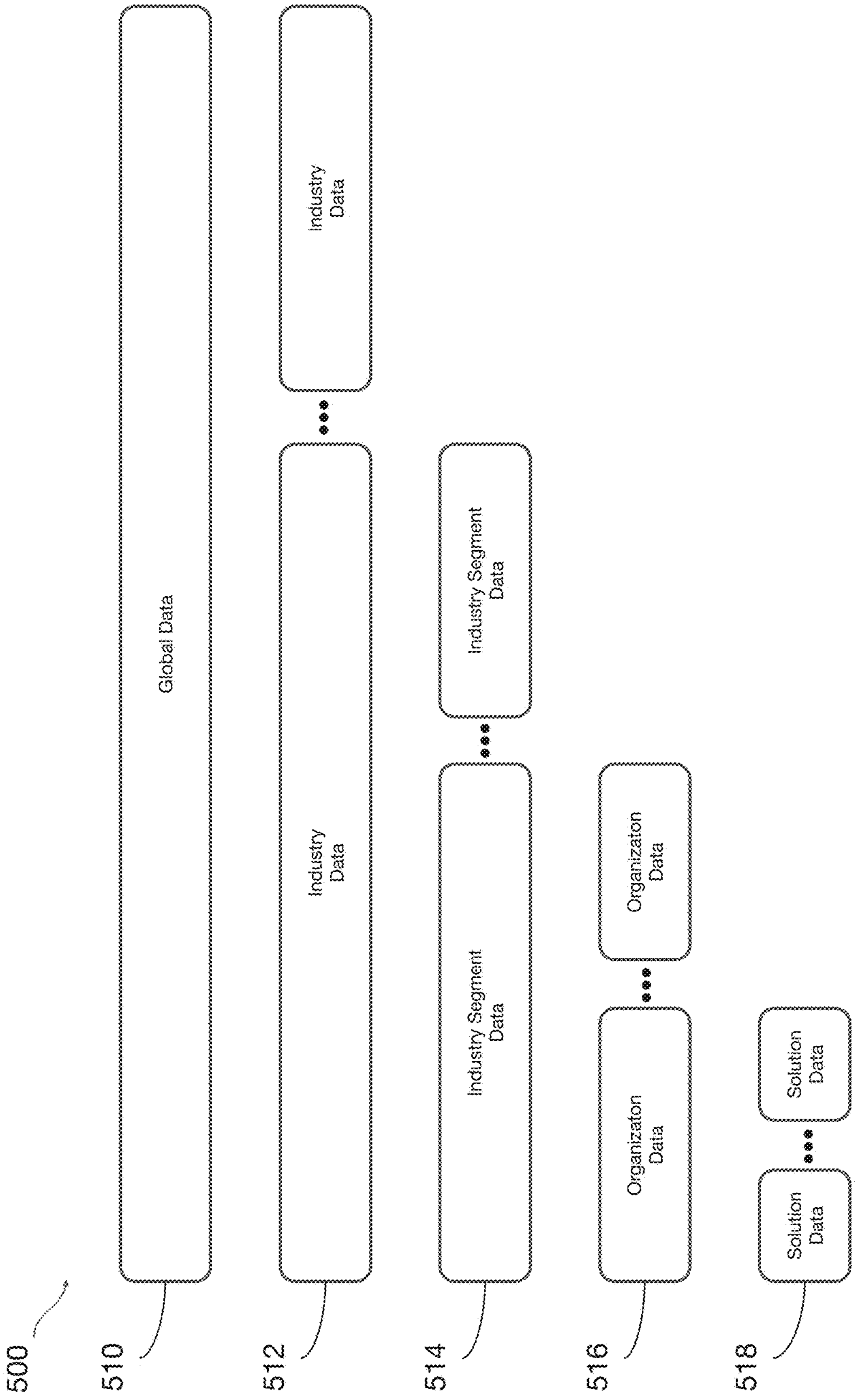
FIG. 5 is an example of a data structure hierarchy, according to one embodiment.

Master data is defined for a selected scope. FIG. 5 depicts an example data hierarchy showing five scopes of master data: Global Data 510, Industry Data 512, Industry Segment Data 514, Organization Data 516, and Solution Data 518. In one example, each data level is stored as one or more separate data files that can be accessed by tools such as, for example, the Organizer 104, Architect 103, and Designer 102, among other possible software tools. In some implementations, master data is stored in data files that are accessible to multiple organizations or multiple departments within a single organization. For instance, master data may be created for one organization. The rules represented by this master data may be applicable for other organizations. Thus, in some implementations, this master data may be stored in a data file (or files) that is (or are) accessible to the other organization. In this way, the other organization may benefit from relevant master data without having to expend resources to re-create master data. In some additional implementations, libraries of example master data may exist from which an operator may select master data relevant to a given organization to include as master data for that organization.

turning now to individual classifications of master data, Global Data 510 may include Master data that applies generally across all industries and/or entities. For example, country names, city names, zip codes, phone numbers, etc. are all examples of master data that may be applicable across industries and/or entities.

By way of example, Industry Data 512 may include master data that applies to a specific industry. For example, healthcare diagnostic codes are standardized across the healthcare industry, and may be used by managed care corporations, pharmaceutical companies, and health insurance companies, among other possibilities. These diagnostic codes may not have value to other industries such as the automobile or consumer electronics industries, but instead may be specific to a particular industry, such as the healthcare industry in this example.

By way of example, Industry Segment Data 514 may include master data that applies to a specific segment of an industry. Continuing with the previous example, managed care companies may be interested in hospital bed count and ICU occupancy rate, whereas pharmaceutical companies and health insurance companies may not be interested in or have access to this data.

By way of example, Organization Data 516 may include master data that applies to a specific organization within an industry. Continuing with the previous example, a managed care corporation such as "Cottage Hospital" may have specific facility names or medical groups that are not used by other hospitals.

By way of example, Solution Data 518 includes master data that applies to a particular architecture of the business network. Continuing with the previous example, Cottage Hospital financial business unit may have a budget and employee list that is specific to that business unit, and not relevant to other business units at Cottage Hospital.

In operation, a master network can, for example, be used to validate data that may be syntactically "correct," but that does not make sense or is otherwise not possible in the business or entity. For example, consider a digital duplicate for Company X that manufactures a product P1 in factory F1 and factory F3, and manufactures a product P2 in factory F2, but does not manufacture product P1 in factory F2. If data is imported into the digital duplicate for product P1 such that the data indicates product P1 is manufactured in factory F2, then that data may be "invalid" (even though it may otherwise be syntactically correct). In another example, consider a digital duplicate for Company X that has a vendor named Company Y. Since Company Y is a vendor, it is not expected that revenue will be generated for Company X from Company Y. If data is imported into the digital duplicate for Company X such that the data indicates revenue is generated from Company Y, then that data may be invalid (even though it may otherwise be syntactically correct).

In yet another example, consider a digital duplicate for Company X that produces both lawn mowers and tractors. Further, let Company Z be a dealer for Company X where Company Z sells lawn mowers for Company X but does not sell tractors for Company X. If data is imported into the digital duplicate for Company X such that the data attributes the sales of tractors to Company Z, then that data may be invalid (even though it may otherwise be syntactically correct). In each of these examples, the syntax of the data may be correct, but the data represents an unexpected (and potentially invalid) business or relationship situation.

A master network may include master data that is assigned to one or more master nodes and/or master links. For a master node, the data may be assigned to a key property and zero or more secondary properties. For a master link, the data is assigned to the key property of each of the two or more master nodes that the link is connecting.

For example, source data may be imported into a digital duplicate from a database (e.g., Excel spreadsheet, Sequel server, etc.) and/or through the use of a user interface (e.g., web-based interface, form input, etc.), either as new data or as an update to existing data. The source data may be validated by comparing the source data to the data of the master node, and/or master link. In practice, in the event the source data does not match the master data, an exception may be raised. In one example implementation, when the source data does not match the master data, the source data is automatically added to the master data of the master node and/or link, and the source data is imported into the digital duplicate. When the source data is added to the master data in this scenario, a confidence level indicator (discussed further below) may be used to indicate a lower confidence level in the accuracy of the data since the data was added as an exception. In another example, when the source data does not match the master data, the source data is automatically added as exception data to the master node or link, but the source data is not imported into the digital duplicate. In this example, there may be a requirement that exception data be further validated, for example, by a domain expert or otherwise authorized user, before it is permitted to be added to the master data for future use. In another example, if the source data matches the master data for a key property of a master node but does not match the master data for a secondary property of a master node, then there are two options. In the first option, source data that does not match the master data for the secondary property may be replaced by the source data for the secondary property. In the second option, the source data for the secondary property is ignored. In each of these examples, an alert or other notification may be provided to indicate the source data did not match the master data or a portion thereof.

Master data that is stored in a master node and master link may be accessed, for example, by the Organizer 104, the Architect 103, and/or the Designer 102 of FIG. 1, among other possible software tools. Such master data may take the form of a list, column, table, etc. Each property (e.g., key property or secondary property) of a master node includes an identifier and one or more additional details of the property. For example, the property details may include a name, data type, length/scale, etc. In addition, each property may also include a confidence level. The confidence level is used to characterize the confidence in the accuracy of the master data for that property. For example, if a master data is added by a domain expert, then the confidence level may be very high (e.g., 9 on a scale of 0-9). In another example, if the master data is added by a junior employee, then the confidence level may be in the middle (e.g., 6 on a scale of 0-9). In yet another example, if the master data is added after being identified as a master node or master link exception (i.e., the item did not match the previously defined master data), then the master data may receive a lower confidence level (e.g., 3 on a scale of 0-9).

Example Master Node

As mentioned, a master node can be used to verify the source data used to populate the nodes of a semantic network (e.g., a semantic network representing a business or entity in the digital duplicate). For example, assume a company manufactures two products P1 and P2, and has three factories F1, F2, and F3. In the semantic network represented by the digital duplicate, a first node may represent the factories (with data for factory F1, factory F2, and factory F3) and a second node may represent the products (with data for product P1 and product P2). The master node can be used to verify the factory data includes only factories F1, F2, and F3, and the product data includes only products P1 and P2.

Figure 6:
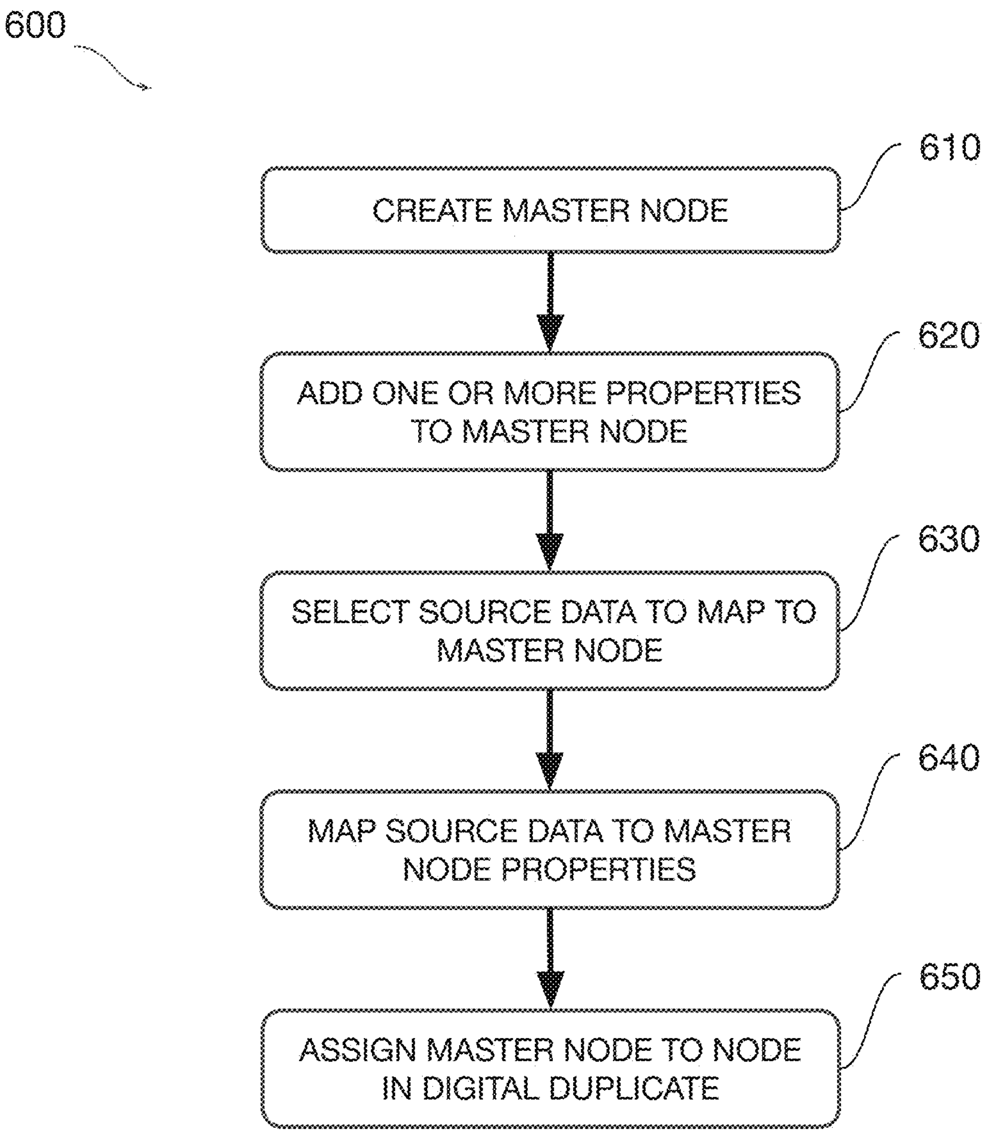
FIG. 6 is a flow diagram depicting example operations that may be carried out in accordance with one or more embodiments of the present disclosure.

FIG. 6 depicts an example method 600 for establishing a master node that can be implemented within an operating environment including or involving, for example, the system 100 of FIG. 1. The method 600 may include one or more operations, functions, or actions as illustrated by one or more blocks. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

According to an example implementation, establishing a master node may begin with a first user interfacing a software application (e.g., stand-alone application, web-based application, etc.) that may run on the client station 113 (FIG. 1*b*), be hosted on a back-end platform 112 (FIG. 1*b*), or a combination of both, among other possibilities. An example software application is the Organizer 104 (FIG. 1*a*), but other software applications are possible as well.

Figure 7:
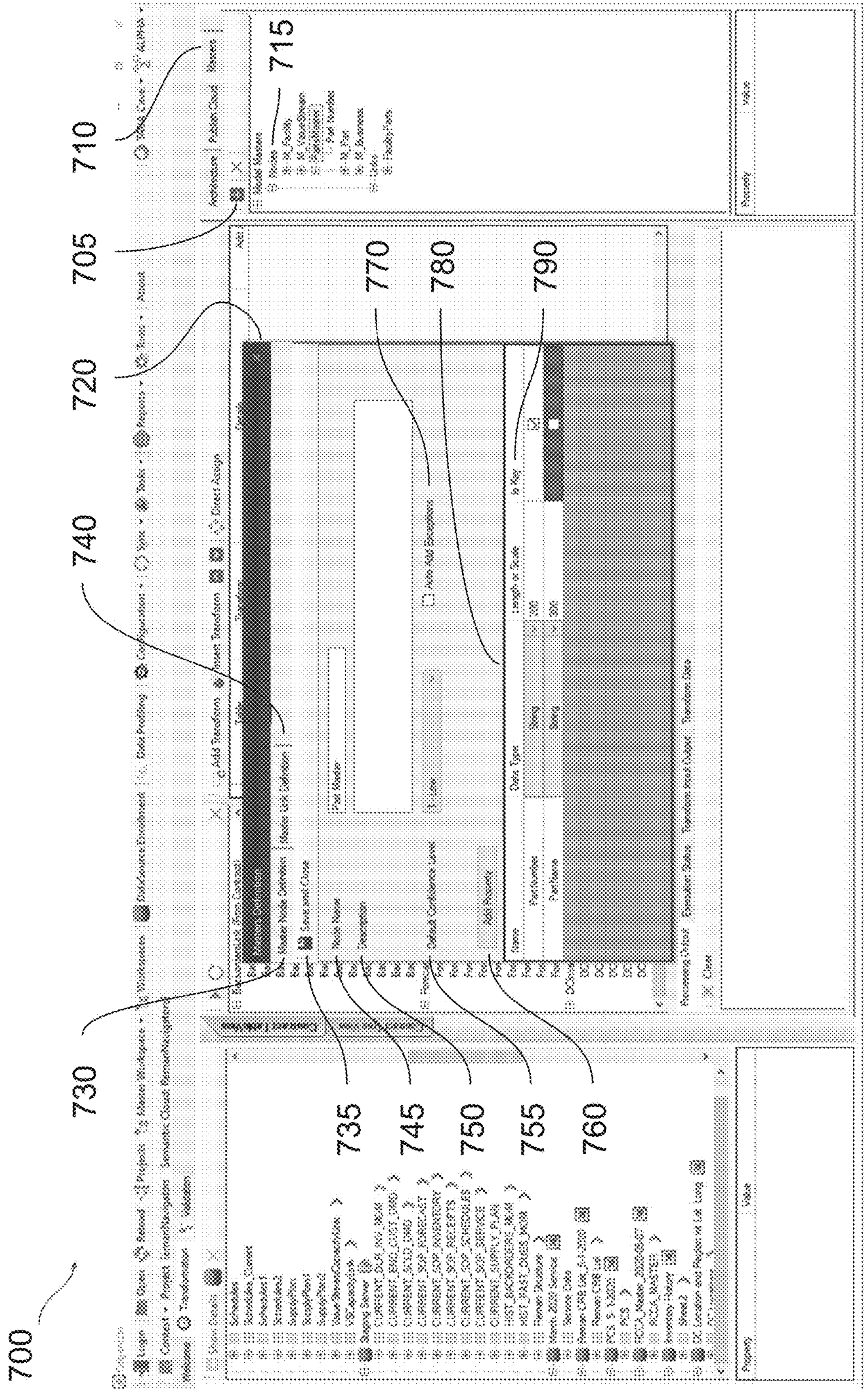
FIG. 7 is a snapshot of a software tool according to one embodiment of the present disclosure.

In block 610, a new master node is created. To help illustrate one example of this, FIG. 7 depicts an example screen 700 of the Organizer 104 software tool that may enable a user to create a new master node. In the example shown in FIG. 7, the user may select the "Add" software button 705 in the "Master" tab 710 to create a master node.

In block 620, one or more properties are added to the master node. Referring to FIG. 7, after the "Add" software button 705 is selected, a "Masters Definition" pop-up screen 720 may be displayed. The "Masters Definition" pop-up screen 720 includes a "Master Node Definition" tab 730 and a "Master Link Definition" tab 740. The user may select the "Master Node Definition" tab 730 on the pop-up screen 720 to begin adding properties to the master node. The user may add a master node name 745, a master node description 750, and one or more properties of the master node; set the default confidence level 755 for the one or more properties; and define the master node exception behavior 770.

In one implementation, a user may select the "Add Property" software button 760 to add one or more properties to the master node. After the "Add Property" software button 760 is selected, the user may add details for the property as shown in area 780 of the pop-up screen 720. For example, the details shown in area 780 include "Name" for the property name, "Data Type" for the type of data associated with the property, "Length or Scale" to indicate the size of the data associated with the property, and "IsKey" to identify if the property is a key property. A key property is a property with a unique value. For example, an employee identification number is typically unique within the organization, and therefore can be a key property. On the other hand, an employee's first name may not be unique within an organization, and therefore may not make a good candidate for a key property. In this case, the first name may instead be a secondary property. In the example shown in FIG. 7, two properties "PartNumber" and "PartName" have been added. "PartNumber" has a "string" data type, is 200 characters long, and is a key property. "PartName" is also a "string" data type, is 200 characters long, but has not been identified as a key property.

In addition to the master node property details, the user may set a default value for the confidence level. As mentioned above, the confidence level is used to characterize the confidence in the accuracy of the data for the properties. For example, the confidence level may be in the range of 0-9, where 0 indicates low confidence and 9 indicates high confidence. In the example shown in FIG. 7, the user may set the default confidence level 755 by selecting a value from the "Default Confidence Level" drop-down menu item on the screen 700. In one example, a single confidence level indicator is set for the data for all properties of the master node that are added by the user. In another example, a confidence level may be set independently for the data for each property of the master node that is added. Although a default confidence level is set when the property is added, it is possible for the confidence level to change over time.

The user may also define the master node exception behavior 770. An exception may be raised if source data does not match the data of the one or more master node properties. In one example, if the "Add All Exceptions" software button has been selected for the master node, then exceptions will be added to the master node properties and the source data that caused the exception will be imported. Alternatively, if the "Add All Exceptions" software button 770 is not selected, then exceptions will not be automatically added to the master node properties and the source data that caused the exception will not be imported. In one example, enabling exceptions to be added to the master node properties is set for all master node properties that are added by the user. In another example, enabling exceptions to be added to the master node properties is set independently for each master node property that is added.

The user may select the "Save and Close" software button 735 to save the master node and its properties. The master node and properties may be stored locally on the client station 113 (FIG. 1B), remotely on a back-end platform 112 (FIG. 1B), or a combination of both, among other possibilities. After the properties have been saved, the new master node will appear in the list of master nodes 715.

Figure 8:
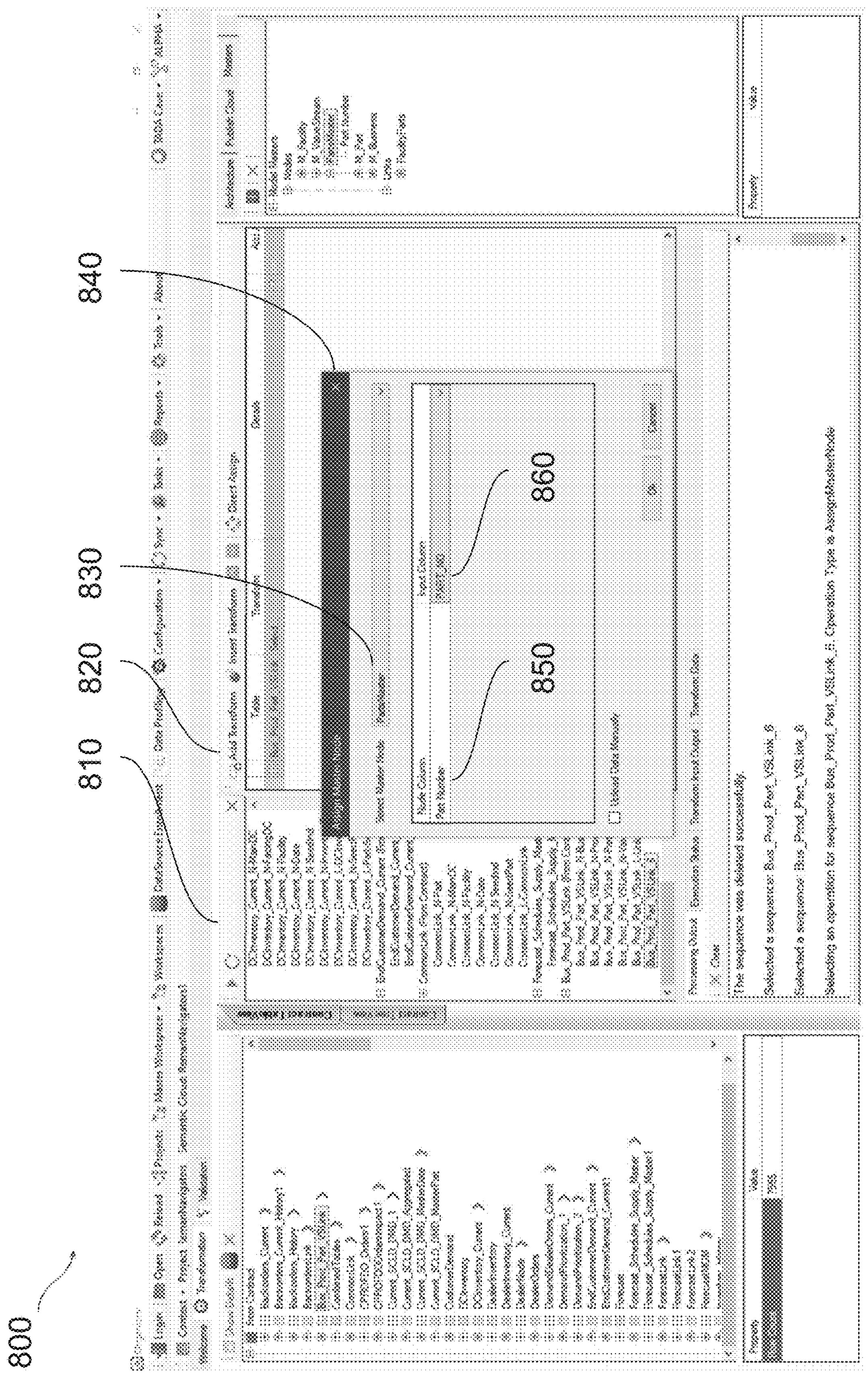
FIG. 8 is a snapshot of a software tool according to one embodiment of the present disclosure.

In block 630, a source data may be selected and mapped to the one or more properties of the master node. To help illustrate this, FIG. 8 depicts an example screen 800 of the Organizer 104 software tool that may enable a user to select a source data for the master node. In the example shown in FIG. 8, a user selects the source data from the data sources 810 that have been added to the Organizer 104.

In block 640, one or more elements of the source data are mapped to the properties of the master node. For example, one or more columns of the source data may be mapped to the properties of the master node.

Referring back to FIG. 8, after the data source has been selected, the user may select the "Add Transform" software button 820 to create the transform. After the 'Add Transform" software button 820 is selected, a pull-down menu (not shown) may be displayed whereby the user may select "Assign Master Node." After the "Assign Master Node" has been selected, the "Assign Master Node" pop-up menu 840 may be displayed. The user may select the master node 830 from a pull-down menu of available master nodes. For example, the master node "PartsMaster" is shown selected in FIG. 8. After the master node is selected, the "Part Number" property 850 of "PartsMaster" master node 830 is shown under the "Node Column" heading. In this example, the "Part Number" property 850 is a key property of "PartsMaster" master node 830. However if there were multiple properties defined for "PartsMaster" master node 830 (e.g., a key property and one or more secondary properties), then the one or more properties could be shown under the "Node Column" heading 850. A property from the source data under the "Input Column" heading 860 may be selected to map to the "Part Number" property 850. In this example, the "PART NO" property 860 was selected from the source data file to map to the "Part Number" property 850.

Note that additional source data may be used for populating the master data using the same methodology described above. In practice, there is no limit to how many source data blocks may be used for this process. Various source data blocks may come from different data stores or systems.

In addition to mapping the source data to the properties of the master node, in some embodiments one or more data aliases may be defined for each property. A data alias is an alternative acceptable value for a property of the master node where the "main value" is standard acceptable value. If the data alias is identified in the source data for verification, then the source data is imported with the alias value replaced with the main value. For example, assume the main value for a "state" property of a master node is "California" and a data alias is "CA." If a source data file has "CA" corresponding to the "state" property, then the source data would be considered "valid" and the "CA" value would be replaced with "California" upon import. Of course, other examples are possible.

After the one or more source data fields (e.g., columns) have been mapped to the one or more properties of the master node, the user can execute the transform to input the data into the master node. The master data may be stored, for example, in the Organizer Data Store 109 which may reside locally on the client station 113 (FIG. 1*b*), remotely on a back-end platform 112 (FIG. 1*b*), or a combination of both, among other possibilities.

In block 650, a master node may be assigned to a node in a digital duplicate for verification purposes.

In one example, a master node is assigned to a node in a digital duplicate during the process of establishing the master node. For example, with reference to FIG. 7, an additional field may be added in the "Master Node Definition" tab 730 to allow the user to select the node from a list of nodes in the digital duplicate. The "key" property of the master node may be automatically assigned to the "key" property of the node in the digital duplicate. If the master node has multiple properties defined (e.g., a "key" property plus one or more secondary properties), then each secondary property may need to be mapped to a property of the node in the digital duplicate when the node is selected for assignment.

Figure 9:
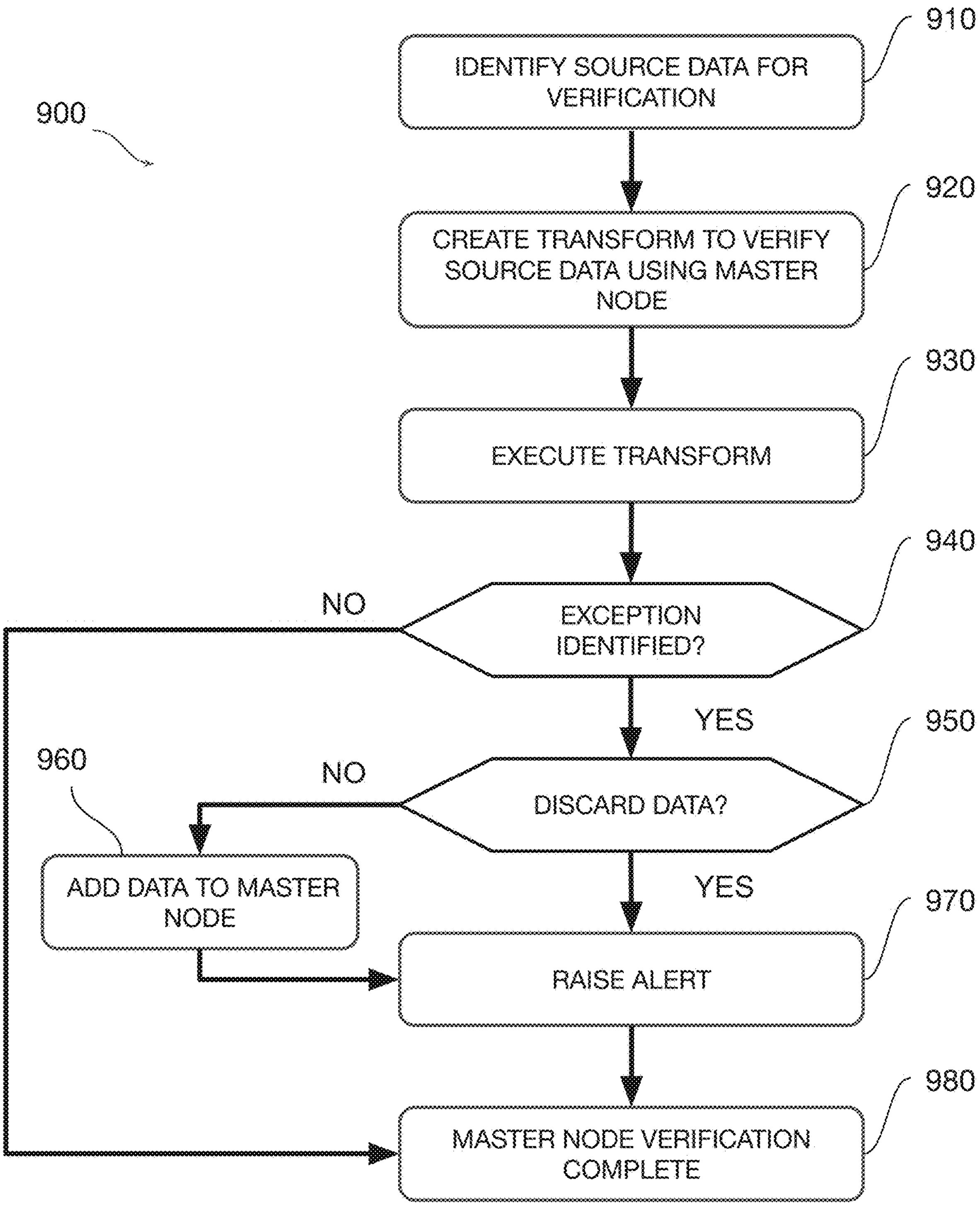
FIG. 9 is a flow diagram depicting example operations that may be carried out in accordance with one or more embodiments of the present disclosure.

FIG. 9 depicts an example method to verify source data using a master node. The method may be implemented within an operating environment including or involving, for example, the system 100 of FIG. 1. The method 900 may include one or more operations, functions, or actions as illustrated by one or more blocks. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Figure 10:
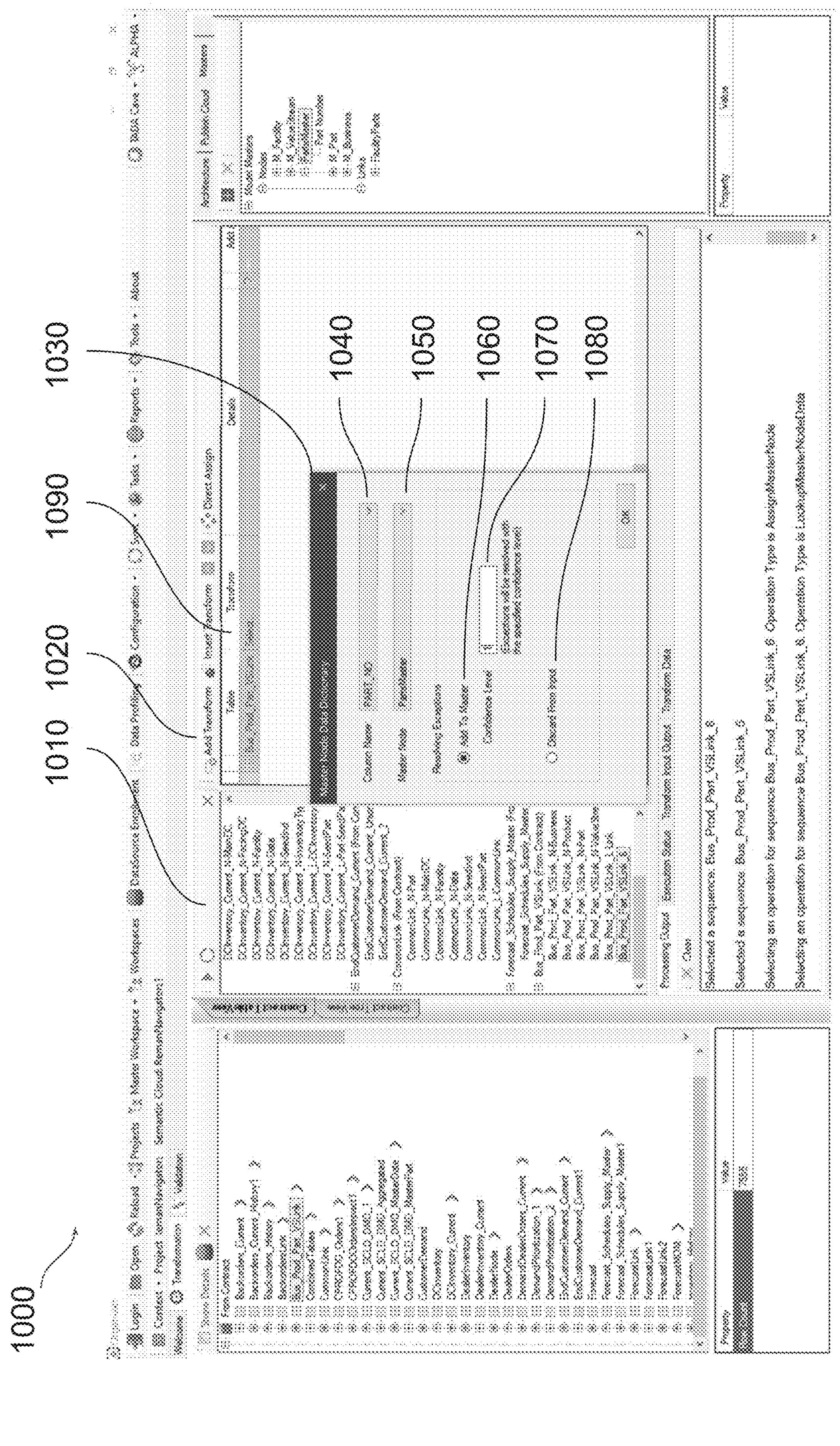
FIG. 10 is a snapshot of a software tool according to one embodiment of the present disclosure.

In block 910, the source data is identified for verification. To help illustrate, FIG. 10 depicts an example screen 1000 of the Organizer 104 software tool that may enable a user to select the data source to be verified. In the example shown in FIG. 10, a user selects a source from the data sources 1010 that have been added to the Organizer 104.

In block 920, a transform is created to verify the source data using the master node.

Referring back to FIG. 10, the user may select the "Add Transform" software button 1020 to create the transform to verify the source data. After the "Add Transform" software button 1020 is selected, a "Master Node Data Dictionary" pop-up screen 1030 is displayed. A field (e.g., column) from the source data may be selected as the source of the data to be verified. This can be done using the "Column Name" drop-down list 1040. For example, the "PART NO" column is shown as selected in FIG. 10. The user may also select the master node that will be used to verify the source data. This can be done using the "Master Node" drop-down list 1050. For example, the "PartsMaster" master node is shown as selected in FIG. 10. By selecting the master node, the one or more properties of the master node will be used to verify the source data. In one example, if multiple properties exist for a master node (e.g., a key property and one or more secondary properties), then the property that is used to verify the data is determined based on matching the data type fields of the master node properties to the data type fields of the data being verified. In another example, if multiple properties exist for a master node (e.g., a key property and one or more secondary properties), then the property that is used to verify the data is selected by the user. Other examples exist.

As described above, exceptions will be raised if the input data is not validated by the master data. In one example, the exception resolution parameters may be established (or changed) when creating a transform. To set the exception resolution parameters, the user may select either the "Add to Master" software button 1060 or the "Discard from Input" software button 1080. The "Add to Master" software button 1060 may be selected to indicate that data that is not validated will be added to the one or more master node properties with the confidence level 1070. Note that in one example, the confidence level 1070 may also be configured when creating a transform. Alternatively, the "Discard from Input" software button 1080 may be selected instead of the "Add to Master" software button 1060 to indicate that data that is not validated will be discarded.

Once the transform has been defined, it can be saved and used to verify the source data.

In block 930, the transform is executed to verify the source data. In one example, this is done by a user manually executing the transform. Referring back to FIG. 10, this can be done by selecting and choosing to execute the transform 1090. In another example, the transform may be assigned to a node in a semantic network of a digital duplicate, and the transform is executed as part of one or more procedures of the digital duplicate (e.g., the transform is executed when data is imported or updated, periodically, etc.). For example, once a transform is assigned to the node, then all source data will flow through the transform for verification.

In block 940, a determination is made if an exception is identified. For example, the source data may be verified by comparing the source data with the master data. In the event the source data does not match the master data, an exception can be raised.

If no exceptions were found in block 940, then the source data has been verified and the master node verification process is complete.

If exceptions were found in block 940, then a determination is made in block 950 if the source data that was not found in the master data should be discarded and/or added to the master node. In one example, if the source data matches the master data for the key property, but does not match the master data for a secondary property, then various options can determine whether the existing master value for the secondary property should be left as is or updated.

In block 960, source data that was not found in the master data is automatically added to the master node and the data may be imported. In one example, the source data is added to the master data along with a confidence level. In this case, the confidence level may be set to a lower value to indicate it was added as an exception. In another example, the source data is added to the master node but not used as master data for validation until it is further reviewed and/or verified. For example, a domain expert or authorized user may review and/or verify the data that has been added from an exception before it is usable for validation purposes.

In block 970, an alert is raised to indicate that an exception occurred. In one example, the alert may be in the form of a message (e.g., text, SMS, email, etc.) that is sent to a person who is responsible or has interest in the accuracy of the data. In another example, the alert may also be in the form of a notice that is provided in a software application such as, for example, the Organizer 104, the Architect 103, and/or the Designer 102 of FIG. 1, among other possible software tools. In block 980, the master node verification process is complete.

Example Master Link

A master link can be used to verify the data corresponding to links of a semantic network (e.g., a semantic network representing a business or entity in the digital duplicate). As described above, links are used to connect two or more nodes. For example, assume a company manufactures two products P1 and P2, and has three factories F1, F2, and F3. Furthermore, assume the company manufactures product P1 only in factory F1 and factory F3, and manufactures product P2 only in factory F2. In the semantic network represented by the digital duplicate, a first node could represent the factories (with data for factory F1, factory F2, and factory F3) and a second node could represent the products (with data for product P1 and product P2). Similarly, in the semantic network represented by the digital duplicate, a link between the first node and second node would "connect" the "factories" node with the "products" node, and represent the products that are produced at the corresponding factories. For example, factory F1 producing product P1, factory F2 producing product P2, and factory F3 producing product P1. The master link can be used to verify the connections (or links) between nodes in the semantic network.

Figure 11:
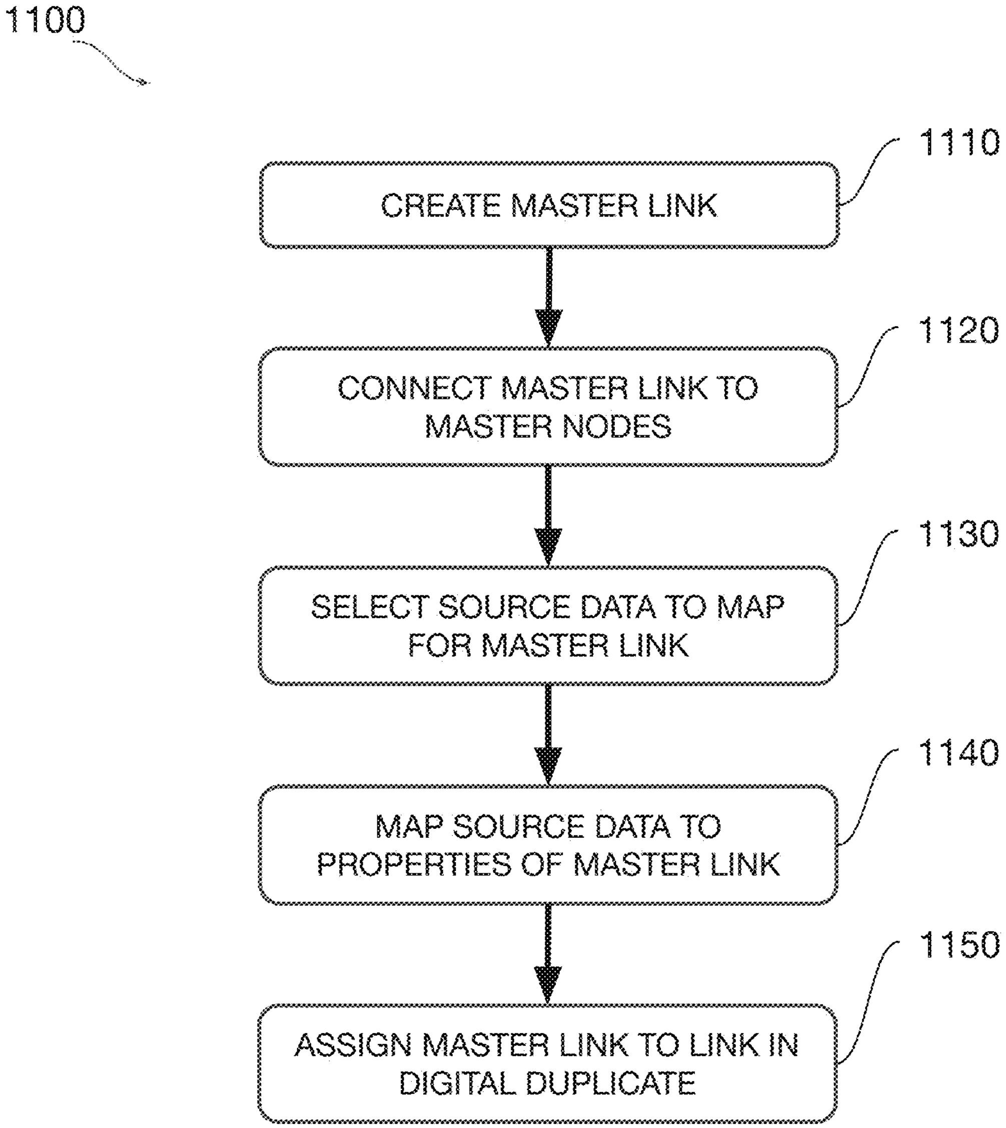
FIG. 11 is a flow diagram depicting example operations that may be carried out in accordance with one or more embodiments of the present disclosure.

FIG. 11 depicts an example method 1100 for establishing a master link that can be implemented within an operating environment including or involving, for example, the system 100 of FIG. 1. The method 1100 may include one or more operations, functions, or actions as illustrated by one or more blocks. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

According to an example implementation, establishing a master link may begin with a first user interfacing a software application (e.g., stand-alone application, web-based application, etc.) that may run on the client station 113 (FIG. 1*b*), be hosted on a back-end platform 112 (FIG. 1*b*), or a combination of both, among other possibilities. An example software application is the Organizer 104 (FIG. 1*a*), although other software tools are possible as well.

Figure 12:
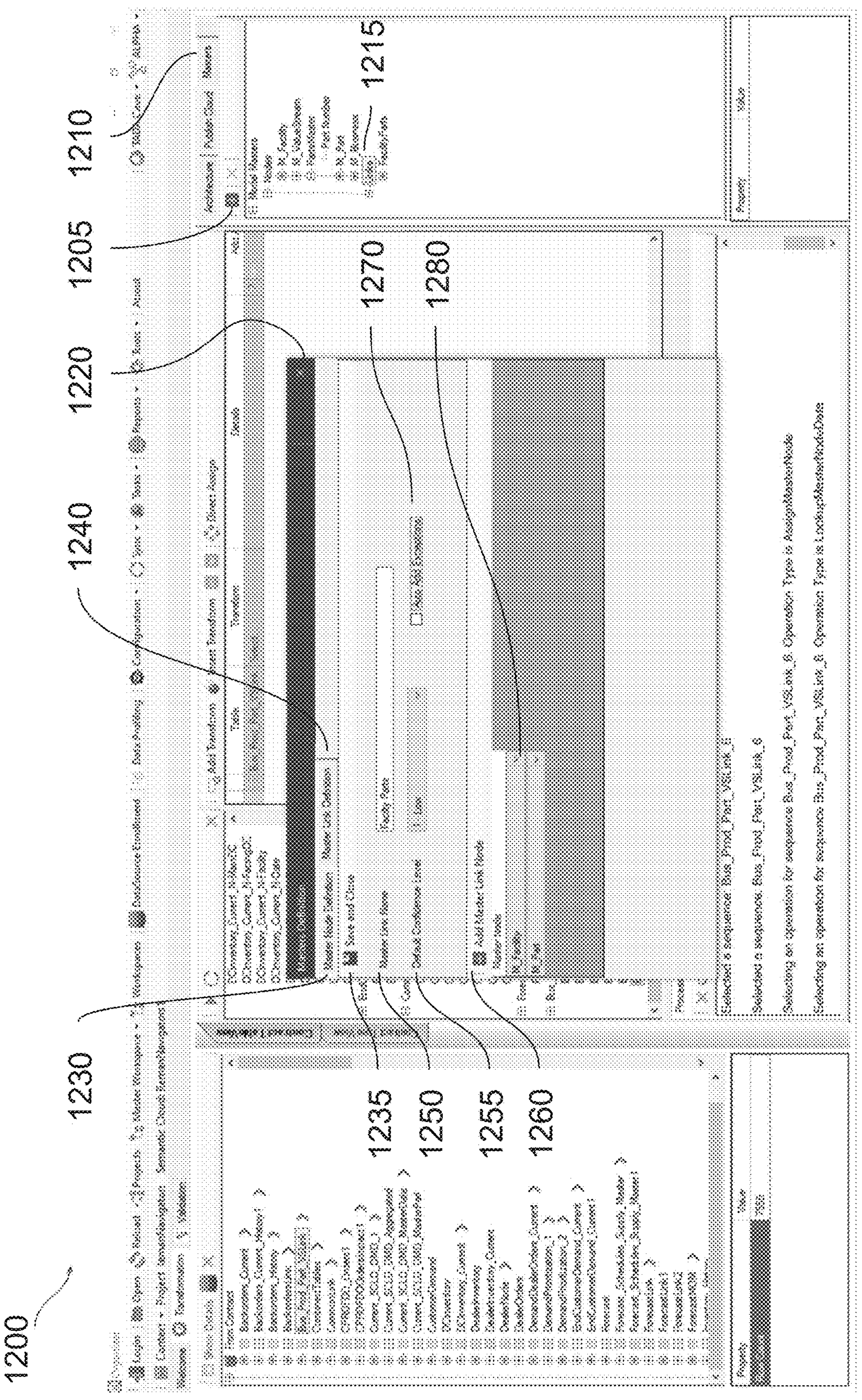
FIG. 12 is a snapshot of a software tool according to one embodiment of the present disclosure.

In block 1110, a new master link is created. To help illustrate an example of this, FIG. 12 depicts an example screen 1200 of the Organizer 104 that may enable a user to create a new master link. In the example shown in FIG. 12, the user may select the "Add" software button 1205 in the "Master" tab 1210 to create a master link.

In block 1120, the master link is connected to two or more master nodes.

Referring back to FIG. 12, after the "Add" software button 1205 is selected, a "Masters Definition" pop-up screen 1220 is displayed. The "Masters Definition" pop-up screen 1220 includes a "Master Node Definition" tab 1230 and a "Master Link Definition" tab 1240. The "Master Link Definition" tab 1240 on the pop-up screen 1220 may be selected to begin adding information to the master link. The user may add a master link name 1250 and two or more master nodes to connect to the master link; set the default confidence level 1255; and define the master link exception behavior 1270.

A user may select the "Add Master Link Node" software button 1260 to add a master node to the master link. For example, the master nodes "M_Facility" and "M_Part" have been added and are shown in area 1280 in FIG. 12. As will be shown below, the master values used in the master link corresponding to each master node must belong to the respective master node's master data.

The user may set a value for the default confidence level 1255 for the master link. As mentioned above, the confidence level is used to characterize the confidence in the accuracy of the one or more master link properties. For example, the confidence level may be in the range of 0-9, where 0 indicates low confidence and 9 indicates high confidence. In the example shown in FIG. 12, the user may set the default confidence level 1255 by selecting a value from the "Default Confidence Level" drop-down menu item on the screen 1200. In one example, a single confidence level is set for all of the master data. In another example, a confidence level may be set independently for each instance of the master data for the master link. In yet another example, a confidence level may be determined as a function of the confidence levels of the master data for the properties of the master nodes that have been added to the master link. Other examples exist. Although a default confidence level 1255 is set when the property is added, it is possible for the confidence level to change over time.

The user may also define the master link exception behavior. An exception may be raised if source data does not match the master data. In one example, if the "Add All Exceptions" software button 1270 has been selected for the master link, then exceptions will be added as master data, and the source data that caused the exception will be imported. Alternatively, if the "Add All Exceptions" software button 1270 is not selected, then exceptions will not be automatically added to the master data, and the source data that caused the exception will not be imported. In one example, enabling exceptions to be added to the master link is set for all properties of the master link. In another example, enabling exceptions to be added to the master link is set independently for each property of the master link.

The user may select the "Save and Close" software button 1235 to save the master link. The master link may be stored locally on the client station 113 (FIG. 1*b*), remotely on a back-end platform 112 (FIG. 1*b*), or a combination of both, among other possibilities. After being saved, the new master link will appear in the list of master links 1215.

In block 1130, a source data is selected to map to the master link.

Figure 13:
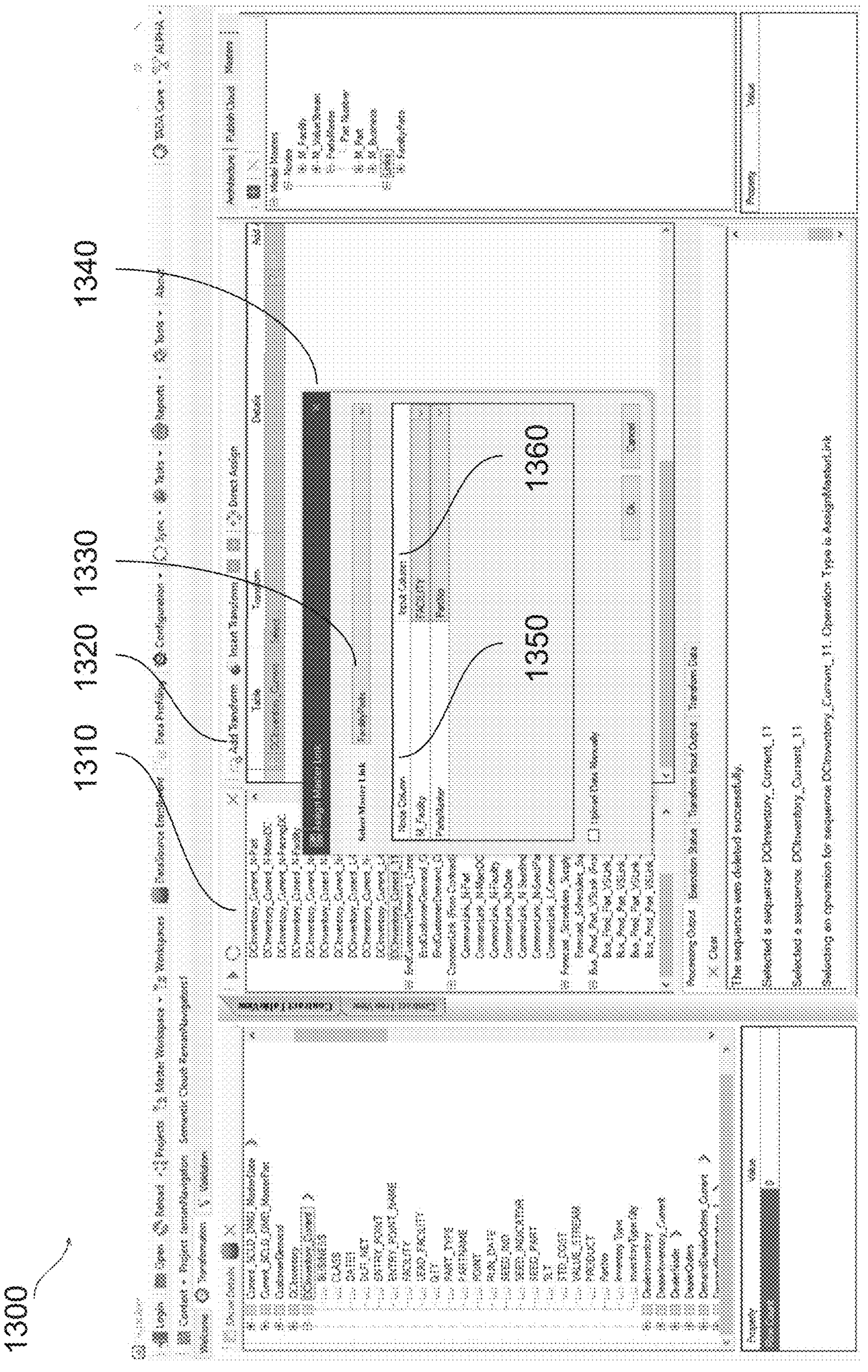
FIG. 13 is a snapshot of a software tool according to one embodiment of the present disclosure.

FIG. 13 depicts an example screen 1300 of the Organizer 104 that may enable a user to select the source data for the master link. In the example shown in FIG. 13, a user may select the source data from the data sources 1310 that have been added to the Organizer 104.

In block 1140, the source data fields are mapped to the properties of the master link.

Referring back to FIG. 13, after the source data has been selected, the user may select the "Add Transform" software button 1320 to create the transform. After the 'Add Transform" software button 1320 is selected, a pull-down menu (not shown) may be displayed whereby the user may select "Assign Master Link." After "Assign Master Link" has been selected, the "Assign Master Link" pop-up menu 1340 may be displayed. The user may select the master link 1330 from a pull-down menu of available master links. For example, the master link "FacilityParts" is shown as selected in FIG. 13. After the master link is selected, the two or more master nodes assigned to the master link may be shown in the "Node Column" 1350.

For each master node shown in the "Node Column" 1350, an "Input Column" 1360 may be selected from the source data to map to the key property of the master node. For example, the "FACILITY" column from the source data is mapped to the key property of the "M_Facility" master node. Similarly, the "PartNo" column from the rsource data is mapped to the key property of the "PartsMaster" master node.

After the source data fields (e.g., columns) have been mapped to the key properties of the master nodes, the user may execute the transform to input the source data into the master link. By executing the transform, the key properties of the master nodes are used to validate the individual source data fields (e.g., columns). Each instance (e.g., row) of the source data that has all of the source data fields (e.g., columns) validated is added as master data to the master link. The master 1 data may be stored, for example, in the Organizer Data Store 109 which may reside locally on the client station 113 (FIG. 1*b*), remotely on a back-end platform 112 (FIG. 1*b*), or a combination of both, among other possibilities.

FIG. 14 depicts an example 1400 where the key properties of the master nodes are used to validate the source data fields (e.g., columns) using a master link. In the example 1400 shown in FIG. 14, a first master node 1410 has master data for factories F1, F2, and F3; a second master node 1420 has master data for products P1 and P2; the source data 1430 for the master link has data for factories F1, F2, and F3 and products P1, P2, and P3; and a master link 1440 has data for product P1 built at factory F1 and F3, and product P2 built at factory F2. The first column of the source data 1430 is verified by the first master node 1410, and the second column of the source data 1430 is verified by the second master node 1420. The elements of the source data 1430 that are not included in the first and second master nodes are shown as "strike-through" in the example. The elements of the master data for the master link 1440 are generated from the resource data 1430, where both elements of a row of the source data 1430 have been verified with the master nodes.

In block 1150, a master link may be assigned to a link in a digital duplicate for verification purposes.

In one example, a master link is assigned to a semantic link in a digital duplicate during the process of establishing the semantic link. After a link has been selected, the user may select two or more nodes in the digital duplicate to map to the two or more master nodes connecting the master link in the master network. The key property of each master node is automatically mapped from the master nodes to nodes in digital duplicate.

Figure 15:
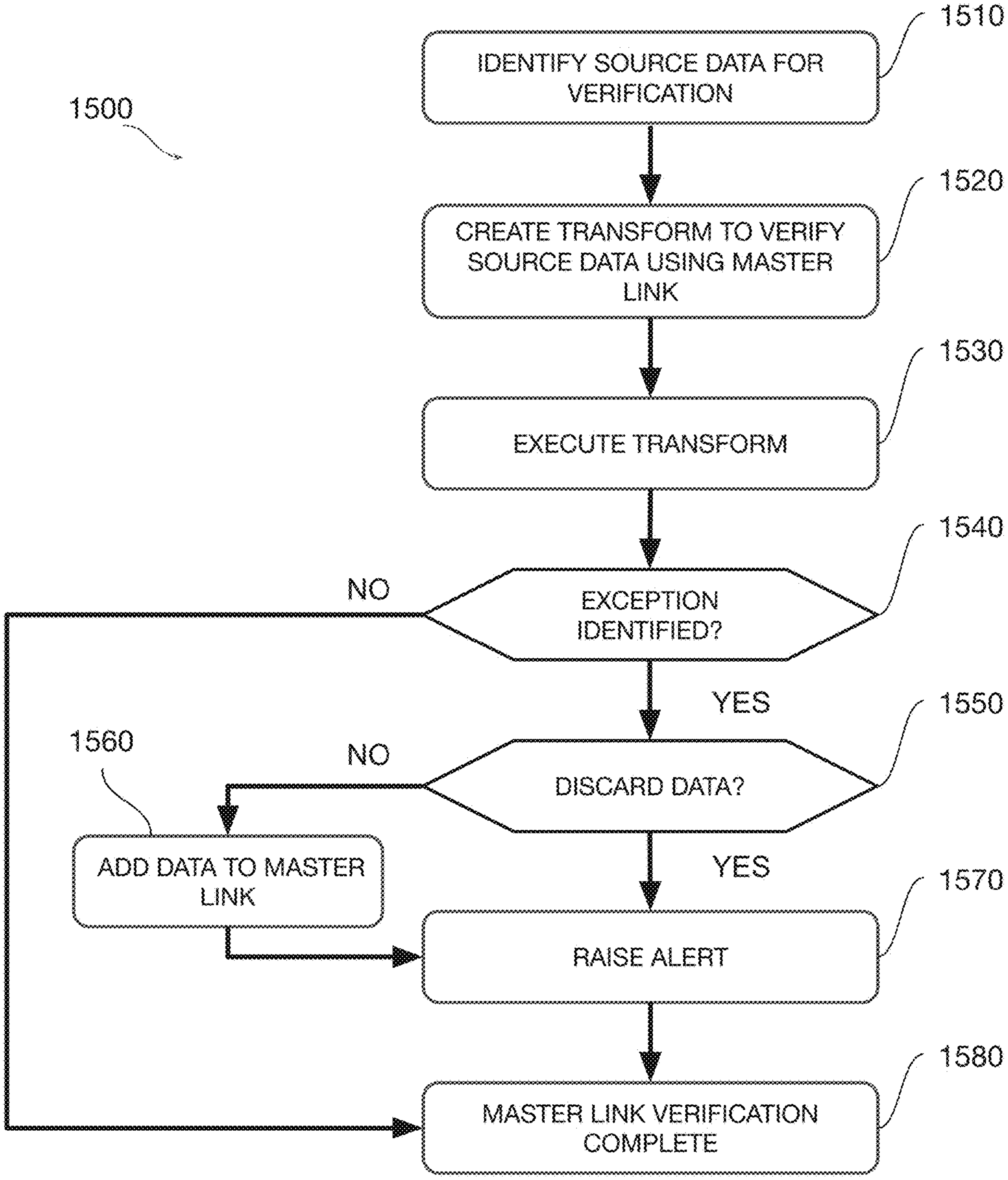
FIG. 15 is a flow diagram depicting example operations that may be carried out in accordance with one or more embodiments of the present disclosure.

FIG. 15 depicts an example method to verify source data using a master link. The method may be implemented within an operating environment including or involving, for example, the system 100 of FIG. 1. The method 1500 may include one or more operations, functions, or actions as illustrated by one or more blocks. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Figure 16:
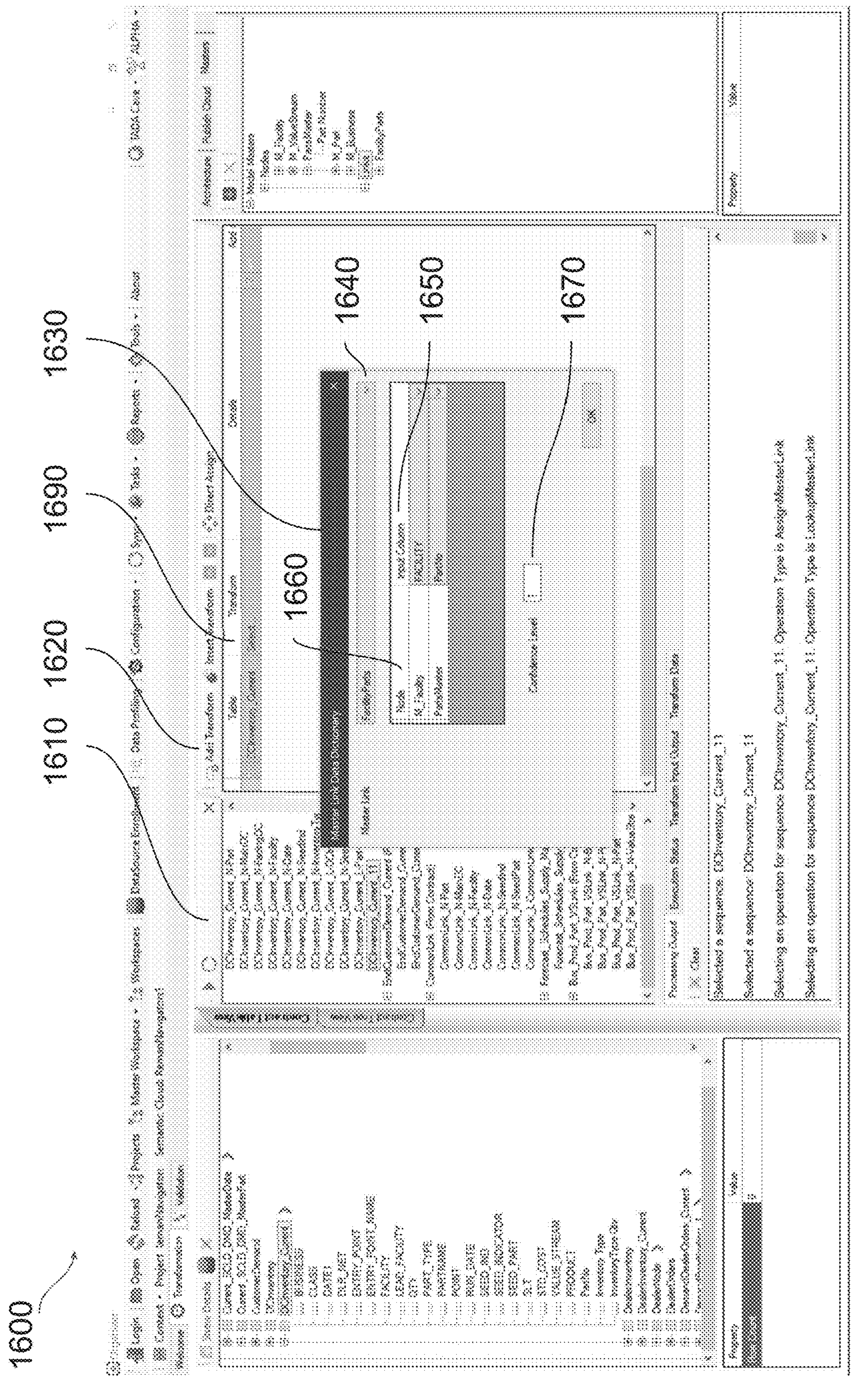
FIG. 16 is a snapshot of a software tool according to one embodiment of the present disclosure.

In block 1510, the source data is identified for verification. To help illustrate, FIG. 16 depicts an example screen 1600 of the Organizer 104 software tool that may enable a user to select the source data to be verified. In the example shown in FIG. 16, a user selects a source from the data sources 1610 that have been added to the Organizer 104.

In block 1520, a transform is created to verify the source data using the master link.

Referring back to FIG. 16, the user may select the "Add Transform" software button 1620 to create the transform to verify the source data. After the "Add Transform" software button 1620 is selected, a "Master Link Data Dictionary" pop-up screen 1630 may be displayed. The user may select the master link that will be used to verify the data using the "Master Link" drop-down list 1640. For example, the "FacilityParts" master link is shown as selected in FIG. 16. Once the master link is selected, the two or more master nodes connected to the master link may be shown in the "Node" column 1660. For example, the "M_Facility" and "PartsMaster" nodes are shown as selected in FIG. 16. If there are multiple additional properties defined for the master link, then the user may be offered a choice these properties in the "Node" column 1660. For each element in the Node column 1660, the user may select a column from the source data to be verified using the "Input Column" drop-down list 1650 in FIG. 16.

As described above, exceptions may be raised if the input data is not validated by the master data. In one example, the exception resolution parameters may be established (or changed) when creating a transform. In one example, the confidence level 1670 may be configured when creating a transform.

Once the transform has been defined, it can be saved and used to verify the source data.

In block 1530, the transform is executed to verify the source data. In one example, this is done by manually executing the transform. Referring back to FIG. 16, this can be done by selecting and choosing to execute the transform 1690. In another example, the transform may be assigned to a link in a semantic network of a digital duplicate, and the transform is executed as part of one or more procedures of the digital duplicate (e.g., the transform is executed when data is imported or updated, periodically, etc.). For example, once a transform is assigned to the link, then all source data that is imported will automatically pass through the transform.

In block 1540, a determination is made if an exception is identified such that the source data was not found in the master data. To validate the source data, the source data is compared to the master data of the master link. In the event the source data does not match the master data, an exception may be raised.

If no exceptions were found in block 1540, then the source data has been verified and the master link verification process is complete.

If exceptions were found in block 1540, then a determination is made in block 1550 if the source data that was not found in the master data should be discarded or added to the master data of the master link.

In block 1560, source data that was not found in the master data may automatically be added to the master link and thereby imported. In one example, the source data is added to the master data along with a confidence level. In this case, the confidence level may be set to a lower value to indicate it was added as an exception. In another example, the source data is added to the master link, but not used for validation until it is further reviewed and/or verified. For example, a domain expert or administrator may review and/or verify the data that has been added from an exception before it is used for validation. In some examples, the source data that is added to the master link is also added to the master node(s) that are connected to the master link. In one example, the source data is added to the master data of the master node(s) along with a confidence level. In one example, the confidence level is the same as the confidence level that was added to the master link. In another example, the confidence level is different from the confidence level that was added to the master link. For example, the confidence level may be set to a lower value to indicate it was added as an exception through the master link. In another example, the source data is added to the master node, but not for validation until it is further reviewed and/or verified. For example, a domain expert or administrator may review and/or verify the data that has been added to the master node before it is available for validation.

In block 1570, an alert is raised to indicate that an exception occurred. In one example, the alert may be in the form of a message (e.g., text, SMS, email, etc.) that is sent to a person who is responsible or has interest in the accuracy of the data. In another example, the alert may also be in the form of a notice that is provided in a software application such as, for example, the Organizer 104, the Architect 103, and/or the Designer 102 of FIG. 1, among other possible software tools.

In block 1580, the master link verification process is complete.

Example Validation Point

A validation point is a construct that can be used with a digital context (e.g., the digital context 310 of FIG. 3, the semantic network 108 of FIG. 1A, etc.) to build a validation framework for the underlying data (e.g., the digital content 320 of FIG. 3, the underlying data 106 of FIG. 1A, etc.). A validation point includes a validation key and two or more validation functions that are designed to generally yield a scalar result when evaluated using the underlying data 106. The validation key is generally a name string. Several types of validation functions are possible. As one possibility, a validation function may take the form of a "raw function," which consists of a sequence of data transforms and/or aggregate functions that operate on raw data imported from data sources. Such functions may operate to reformat the data, trim certain data, add certain characters to the data, and/or perform arithmetic operations on the data, among other possibilities. As another possibility, a validation function may take the form of a "network function," which consists of a network traversal path (e.g., over the semantic network), including optional filters and/or aggregate functions. As another possibility, a validation function may take the form of a "scalar function," which consists of a scalar result that may be imported and/or provided by the user. A "scalar function" is a type of "raw function" that does not need any calculation. Other validation functions may be possible as well.

Generally, a validation function can be executed by an underlying software tool and may be executed with respect to various source data. In practice, when a validation function is executed it may produce what is referred to herein as a "result" or a "validation point value." In practice, this result is generally a scalar value (or an array of scalars). The comparison between the evaluation of the two or more validation functions of a validation point may in some cases follow a set of rules, which form a part of what is referred to herein as a "Validation Point definition."

Different types of rules are possible. As one possibility, an "exact match rule" may specify that results match exactly. If results do not match, an error is identified and action may be taken (e.g., an error notification can be raised). As another possibility, a "range match rule" may specify that results match within a range. If the results do not match with the range, an error is identified and action may be taken (e.g., error notification can be raised). For example, the range could be based on exact values (e.g., plus or minus 300, etc.), a percentage (e.g., differential error less than 5%, etc.), etc. As another possibility, an "error function match rule" may specify that results match based on an error function. If the results do not match, an error is identified and action may be taken (e.g., an error notification can be raised). For example, an error function may provide a changing range (unlike the fixed range in a range match rule). The error function may be defined similar to a raw function or a network function and can be used to model the error in the underlying data 106. Other rules are possible as well.

As mentioned above, the total number of validation functions defined for a validation point must be greater than or equal to two so that a comparison can be made. One example validation function is a "network function" which operates on the data by using an insight created from a traversal of the semantic network. Another example validation function is a "raw function" which operates on the source data without traversing the network. Yet another type of validation function is a scalar function which does not operate on the data. Its value is specified or loaded from a file, database, or other storage. It can be seen that in order to verify the data, at least one of the validation functions should be what is referred to as a network function." Raw functions or network functions may be used across different validation points.

In general, validation can be applied to raw source data, source data that has passed through a transform, or transformed data that has been published (or, in other words, has been populated into an instance of the semantic network) to a semantic network. The case of validation of data residing in a semantic network involves using the data in the semantic network as well as raw and/or transformed source data outside the network used to feed the network. Hence, the usage of two different types of functions in the validation point; namely, "raw function" and "network function". In practice, the validation point may be defined in various ways. As one example, a validation point can be defined using the digital context 320 before the underlying data 106 is populated into the framework of the digital duplicate 105. In one example of this, the validation point may be defined using the Architect tool 103, and one or more network validation functions can be determined or selected by traversing the semantic network 108. The same validation point can be defined and/or modified through the Organizer tool, for example, to add raw functions. Once the underlying data 106 is imported into the framework of the digital duplicate 105, the validation functions (e.g., raw functions, network functions, scalar functions, etc.) of the validation point can be executed to produce various "results," which can be used as measures of data correctness.

The network functions can be subsequently used as the basis for an auto-generated "insight" (e.g., insight 107 in FIG. 1A) that may be used, for example, in the Designer tool 102.

As an example, consider one instance of a digital duplicate for a first organization X and a second instance of a digital duplicate for a second organization Y where the two digital duplicates have overlapping semantics (meaning that the digital duplicates have a subset of similar nodes and links that are designed to contain data that mean the same thing). Because of the shared semantics (in part or in whole), certain validation points used in one digital duplicate for one organization may be copied over and used for the other digital duplicate for the other organization to validate data in both digital duplicates. This ability to reuse validation points across instances of a digital duplicate have the potential to significantly reduce deployment time for new digital duplicates.

Figure 17:
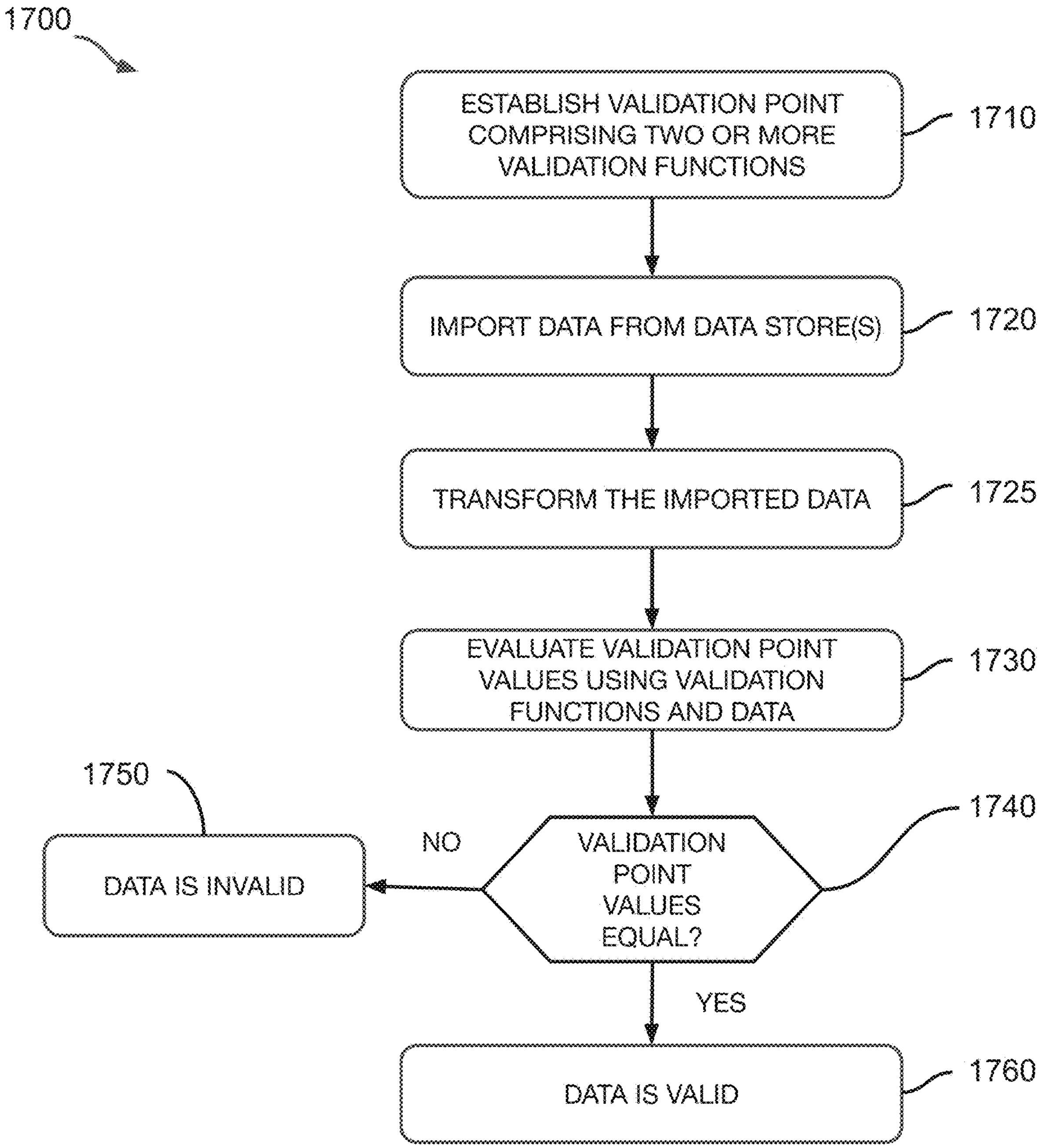
FIG. 17 is a flow diagram depicting example operations that may be carried out in accordance with one or more embodiments of the present disclosure.

FIG. 17 depicts an example method 1700 for establishing a validation point and evaluating underlying data that can be implemented within an operating environment including or involving, for example, the system 100 of FIG. 1. The method 1700 may include one or more operations, functions, or actions as illustrated by one or more blocks. Although the blocks are illustrated in sequential order, these blocks may also be performed in parallel, an/or in a different order than those described herein. Also, the various blocks may be combined into fewer blocks, divided into additional blocks, and/or removed based upon the desired implementation.

According to an example implementation, establishing a validation point may begin with a first user interfacing a software application (e.g., stand-alone application, web-based application, etc.) that may run on the client station 113 (FIG. 1B), be hosted on a back-end platform 112 (FIG. 1B), or a combination of both, among other implementations. An example software application is the architect tool 103 (FIG. 1A).

In block 1710, a validation point is established comprising two or more validation functions. The validation point is defined using the digital context 310 and, in some embodiments, may not require any of the underlying data 106 to be imported into the digital duplicate 105 prior to being defined.

In one example implementation, the validation point is established using the Architect tool 103. As part of the establishment of the new validation point, a user may assign a validation key (or name) to the validation point. For example, the user may provide a descriptive name such as, for example, "Revenue," "Sales," "Claims Paid," "Claims Amount," etc. The validation key may be used, for example, to reference the validation point, the associated validations functions, the evaluation of the validation functions, and the like.

In addition to defining a validation point, the user, e.g., using the Architect tool 103, may define one or more validation functions. As noted above, at least two validation functions are required to compare the results and determine the "correctness" of the underlying data. For example, an end of year business revenue may be input as a single value (i.e., scalar function) to a first validation function, and subsequently compared with a second validation function that calculates the business revenue by traversing the semantic network 108 and summing the revenue for all product models for the year (i.e., network function).

Figure 18:
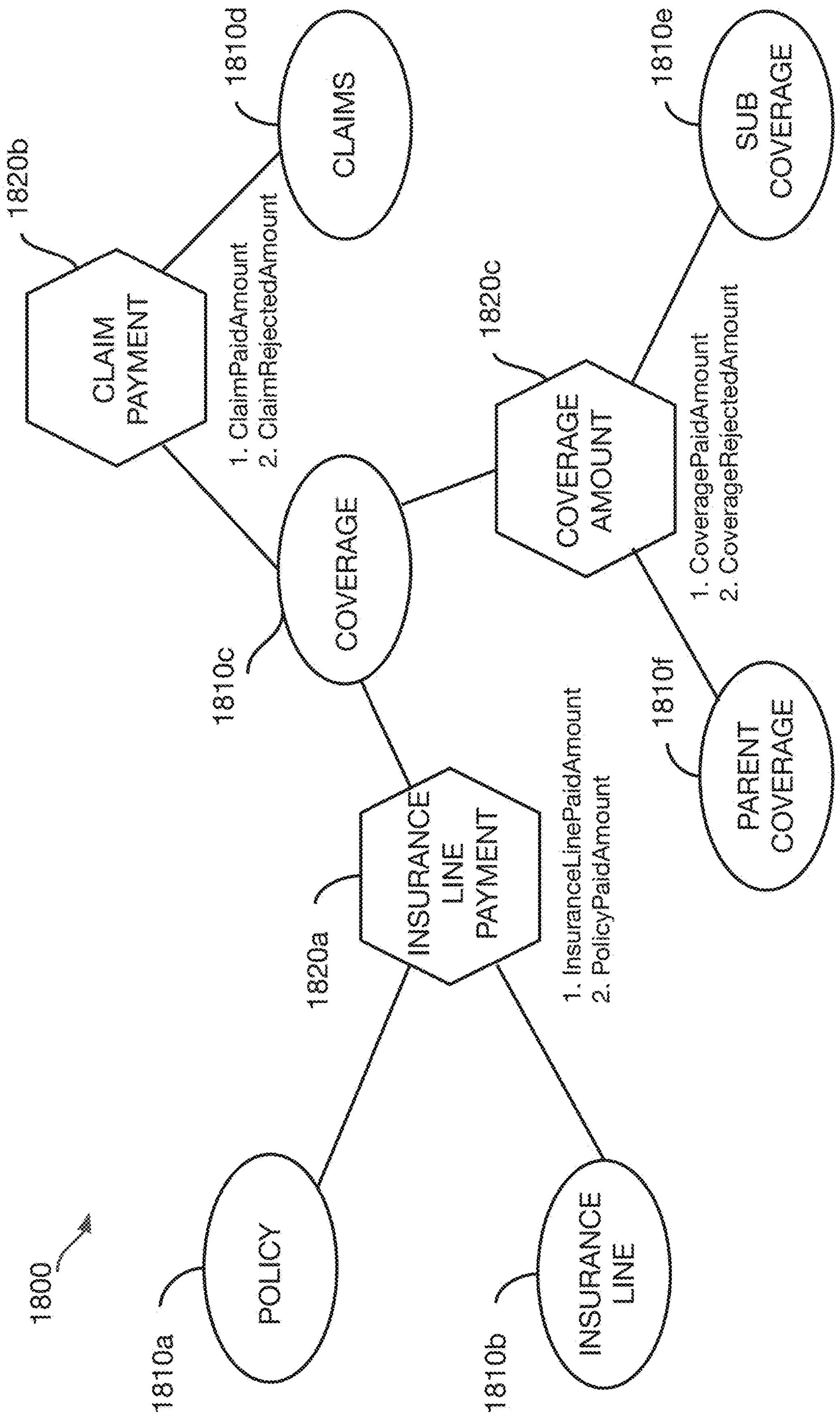
FIG. 18 depicts an example of a validation key applied to an example portion of a semantic network in accordance with one or more embodiments of the present disclosure.

In one example, a validation function may be defined using an interface displaying nodes and links of a semantic network 108 such as the semantic network 1800 shown in FIG. 18. As described in the example below, a user may define a validation function by selecting a "path" through the semantic network connecting two or more nodes and passing through one or more links. In addition to selecting the path, the validation function may include a calculation and/or transformation applied to the one or more properties of the nodes and links included within the selected path. In one example, by selecting the nodes and/or links in a given path to define a validation function this may operate to also include in the validation function the one or more properties of the selected nodes and/or links in the path. In another example, specific properties of the nodes and/or links along the path, rather than all of the properties, may be selected to be used in the validation function. In yet another example, an insight might be selected to represent the path of a validation function.

In another example, the validation function may be determined using semantic terminology that maps to or correlates with a traversal of a semantic network 108. For example, a validation function may be established using terminology such as, "the sum of all claim amounts paid over all coverage types," "the total sales revenue for all trucks sold in the US," and/or "the total build cost of the smart speaker S2000 for the month of January," etc. This terminology may be input as text, voice, formulae, or even shorthand notation depending on the application.

In block 1720, underlying data is imported into the digital duplicate 105 from one or more data stores (e.g., underlying data 106). In one example, this is done using the organizer tool 104, however other mechanisms may be used to import the data and/or update data that has already been imported into the business network.

In block 1725, the imported data may optionally pass through a sequence of transforms that may reshape the data (e.g., change the number of rows and/or columns).

In block 1730, the validation functions are executed using the underlying data and the validation point values are determined.

In block 1740, a comparison is made of the validation point values from the two or more validation functions to determine if there is an error. As discussed above, the comparison between the results produced by execution of the two or more validation functions of a validation point can follow a set of rules such as, for example, exact match rule, range match rule, error function match rule, among other possibilities.

In block 1750, one or more of the validation point values evaluated using the underlying data is determined to be different and the data is considered "invalid." A notification may be provided to the user indicating an error in the data. In one example, the evaluation of the validation functions may be initiated as a result of newly imported and/or updated data. One advantage of doing the verification check at the time the data is newly imported or updated is that errors may be caught before they are presented to the user. In another example, the evaluation may be initiated via a user action such as, for example, selecting "run verification" on a user interface or the like. In yet another example, the evaluation may be initiated when an insight or display widget is run that uses the business data and/or the validation function result. It is possible that if an error is detected in the data that is to be displayed as an insight or widget, then previously "correct" data may be used instead of the "invalid" data, along with an indication that the new data is "invalid."

In one example, the data source(s) that contributed to the error are identified, for example, using the lineage feature described below. An alert notification with the identified data source(s) that contributed to the error may be sent to an authorized user or displayed on the screen to help troubleshoot the error.

In block 1760, the one or more validation point values evaluated using the underlying data is determined to match and the data is considered "valid." A notification may be provided to the user indicating the data has been verified to be valid. This notification may be, for example, as simple as a "tick" icon on a user interface.

Example Validation Point Operations

To help illustrate the foregoing, FIG. 18 depicts an example of a portion of a semantic network 1800 that may be used for a medical insurance company. As depicted in this example, there are six nodes 1810 (i.e., "Policy" 1810*a*, "Insurance Line" 1810*b*, "Coverage" 1810*c*, "Claims" 1810*d*, "Sub Coverage" 1810*e*, and "Parent Coverage" 1810*f*) and 3 links 1820 (i.e., "Insurance Line Payment" 1820*a*, "Claim Payment" 1820*b*, and "Coverage Amount" 1820*c*). Each node 1810 has a node identifier (e.g., "Policy," "Insurance Line," "Coverage," "Claims," "Sub Coverage," and "Parent Coverage") and one or more associated node properties (not shown). As a general matter, the underlying data that is imported into the digital duplicate 108 will include node data and node property data. Node data and/or node property data may also be computed as a function or transformation of the underlying data 106 that is imported or updated. Each link 1820 has a link identifier (e.g., "Insurance Line Payment," "Coverage Amount," and "Claim Payment") and zero or more associated link properties. For example, link properties "InsuranceLinePaidAmount" and "PolicyPaidAmount" are two such link properties of the Insurance Payment link 1820*a*. Similarly, "ClaimPaidAmount" and "ClaimRejectedAmount" are two link properties of Claim Payment link 1820*b*, and "CoveragePaidAmount" and "CoverageRejectedAmount" are two link properties of Coverage Amount link 1820*c*. As a general matter, the underlying data that is imported into the digital duplicate 108 will include link data and link property data. Link data and/or link property data may also be computed as a function or transformation of the business data that is imported.

Figure 19:
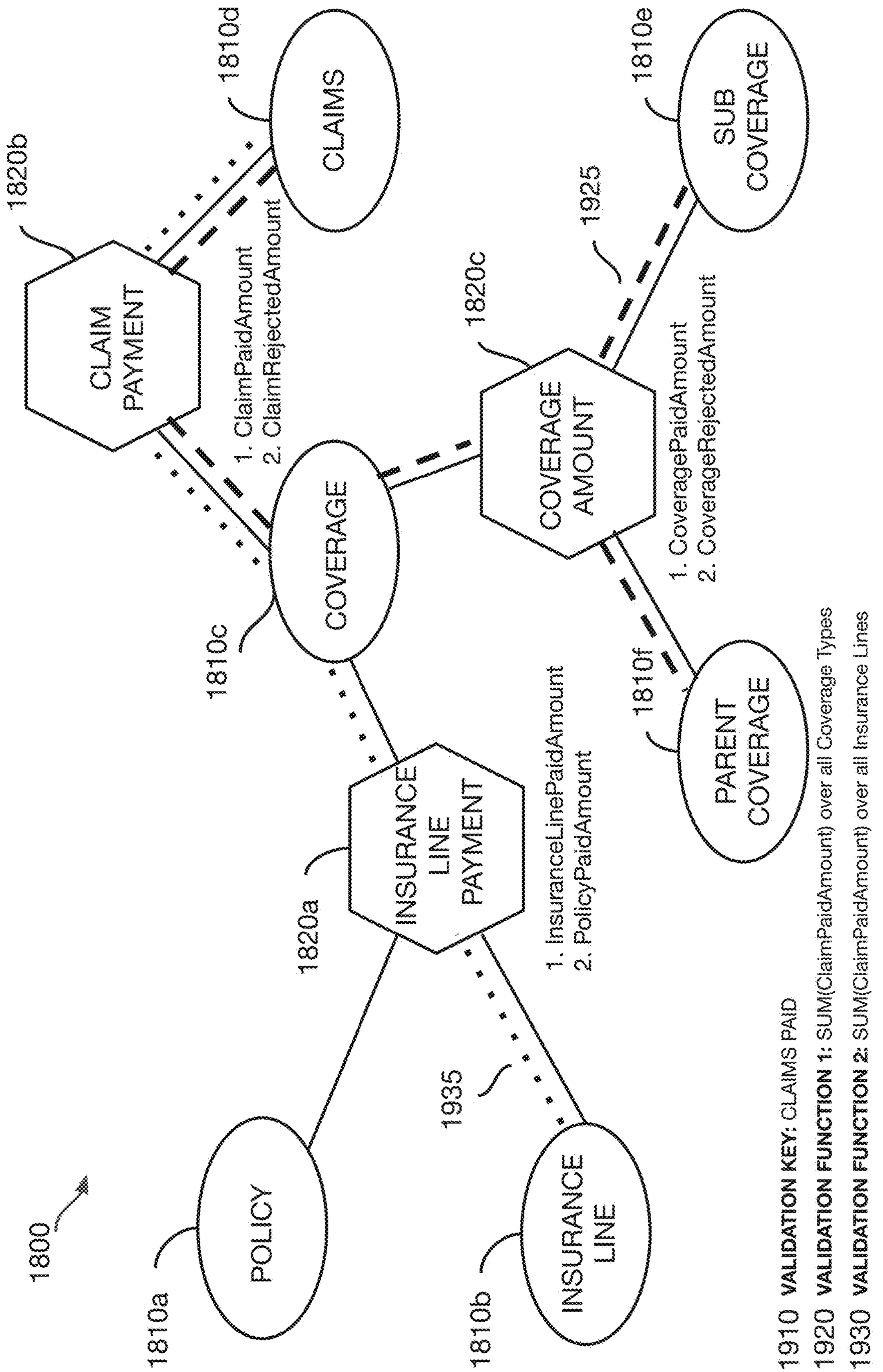
FIG. 19 depicts an example of a validation key and validation functions applied to an example portion of a semantic network in accordance with one or more embodiments of the present disclosure.

FIG. 19 depicts the example semantic network 1800 with a first validation point comprising a validation key 1910 and two validation functions 1920 and 1930. The validation key 1910 has been assigned the name "Claims Paid."

The first validation function 1920 is a network function defined as the total amount of claims paid summed over all coverage types, and is written in semantic form as "SUM (ClaimPaidAmount) over all Coverage Types." The corresponding path 1925 (shown as a dashed line in FIG. 19) through the semantic network 1800 includes nodes claims 1810*d*, Coverage 1810*c*, Sub Coverage 1810*e*, and Parent Coverage 1810*f*. The path 1925 also includes links Claim Payment 1820*b* and Coverage Amount 1820*c*, and utilizes link property ClaimPaidAmount.

The second validation function 1930 is a network function defined as the total amount of claims paid summed over all insurance lines, and is written in semantic form as "SUM (ClaimPaidAmount) over all Insurance Lines." The corresponding path 1935 (shown as a dotted line in FIG. 19) through the semantic network 1800 includes nodes Insurance Line 1810*b*, Coverage 1810*c*, and claims 1810*d*. The path 1935 also includes links Insurance Line Payment 1820*a* and Claim Payment 1820*b*, and utilizes link property ClaimPaidAmount.

As can be seen from this first example, the total amount of claims paid over all coverage types is expected to be equal to the total amount of claims paid over all insurance lines. When the validation functions are evaluated with real data, discrepancies will indicate errors in the data.

Figure 20:
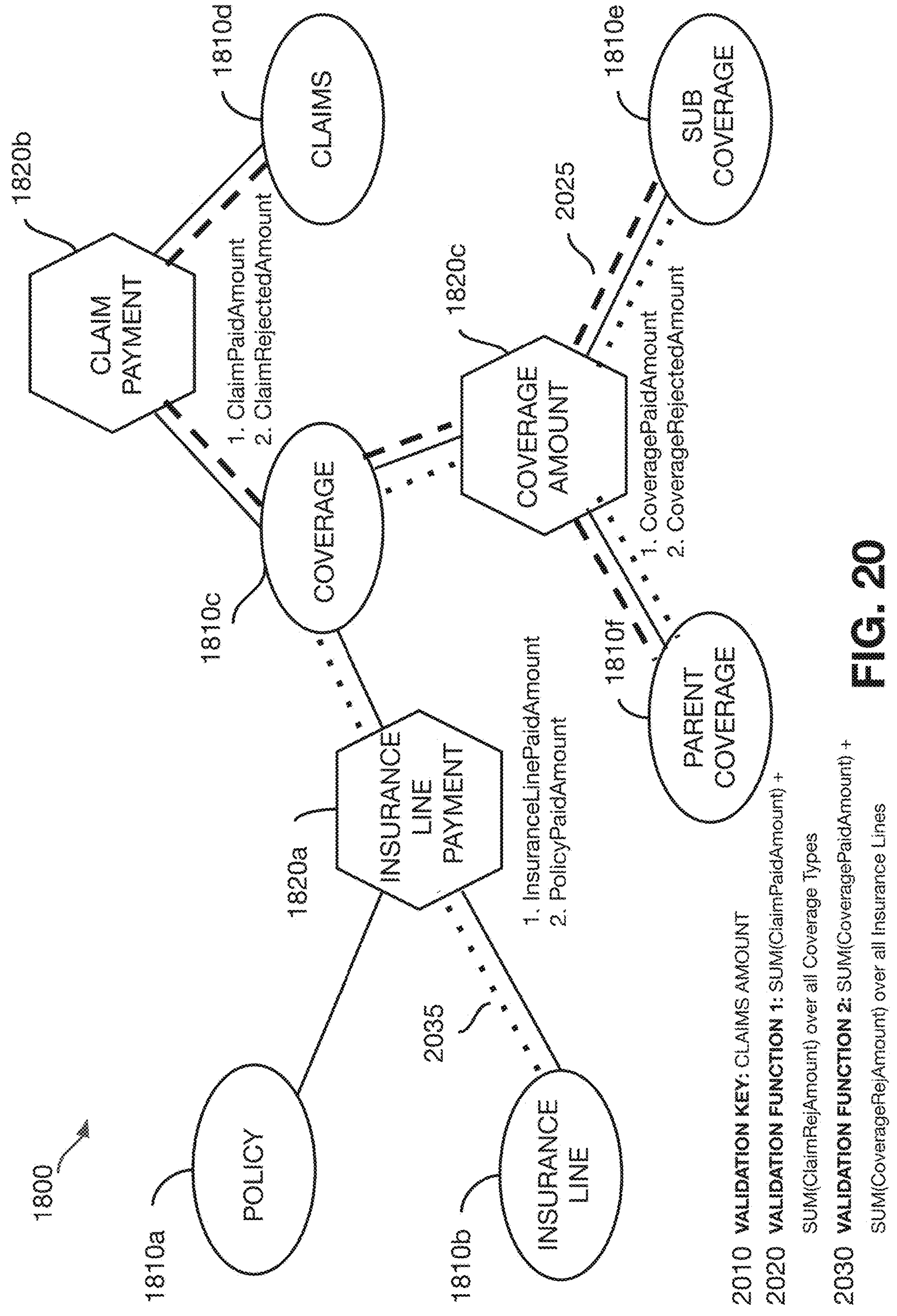
FIG. 20 depicts an example of a validation key and validation functions applied to an example portion of a semantic network in accordance with one or more embodiments of the present disclosure.

FIG. 20 depicts the example semantic network 1800 with a second validation point comprising a validation key 2010 and two validation functions 2020 and 2030. The validation key 2010 has been assigned the name "Claims Amount." The first validation function 2020 is a network function defined as a combination of (i) the total amount of claims paid, and (ii) the total amount of claims rejected, summed over all coverage types, and is written in semantic form as "SUM (ClaimPaidAmount)+SUM (ClaimRejAmount) over all Coverage Types." The corresponding path 2025 (shown as dashed line in FIG. 20) through the semantic network 1800 includes nodes claims 1810*d*, Coverage 1810*c*, Sub Coverage 1810*e*, and Parent Coverage 1810*f*. The path 2025 also includes links Claim Payment 1820*b* and Coverage Amount 1820*c*, and utilizes two link properties, ClaimPaidAmount and ClaimRejectedAmount, of Claim Payment 1820*b*.

The second validation function 2030 is a network function defined as a combination of (i) the total amount of paid claims per coverage, and (ii) the total amount of rejected claims per coverage, summed over all insurance lines, and is written in semantic form as "SUM (CoveragePaidAmount)+SUM (CoverageRejAmount) over all Insurance Lines." The corresponding path 2035 (shown as dotted line in FIG. 20) through the semantic network 1800 includes nodes Insurance Line 1810*b*, Coverage 1810*c*, Parent Coverage 1810*f* and Sub Coverage 1810*e*. The path 2035 also includes links Insurance Line Payment 1820*a* and Coverage Amount 1820*c*, and utilizes two link properties, CoveragePaidAmount and CoverageRejectedAmount, of Coverage Amount 1820*c*.

As can be seen from this second example, the total amount of claims (both paid and rejected) over all coverage types is expected to be equal to the total amount of claims (paid and rejected) over all insurance lines. When the validation functions are evaluated with real data, discrepancies will indicate errors in the data.

FIGS. 21-24 illustrate other examples showing how validation functions can be used to verify data. These examples illustrate how, a verification point with a raw data verification function and a network data verification function can be used to verify the data for different matching rules. FIG. 21 depicts example tables 2100 for an international product company showing portions of three source data tables: Country Table 2110, Facility Table 2120, and Product Table 2130. As can be seen from the example tables 2100, there are two products (P1 and P2) that are manufactured in three facilities (F1, F3, and F5) that are located in three different countries (United States of America, India, and Canada).

Figure 22:
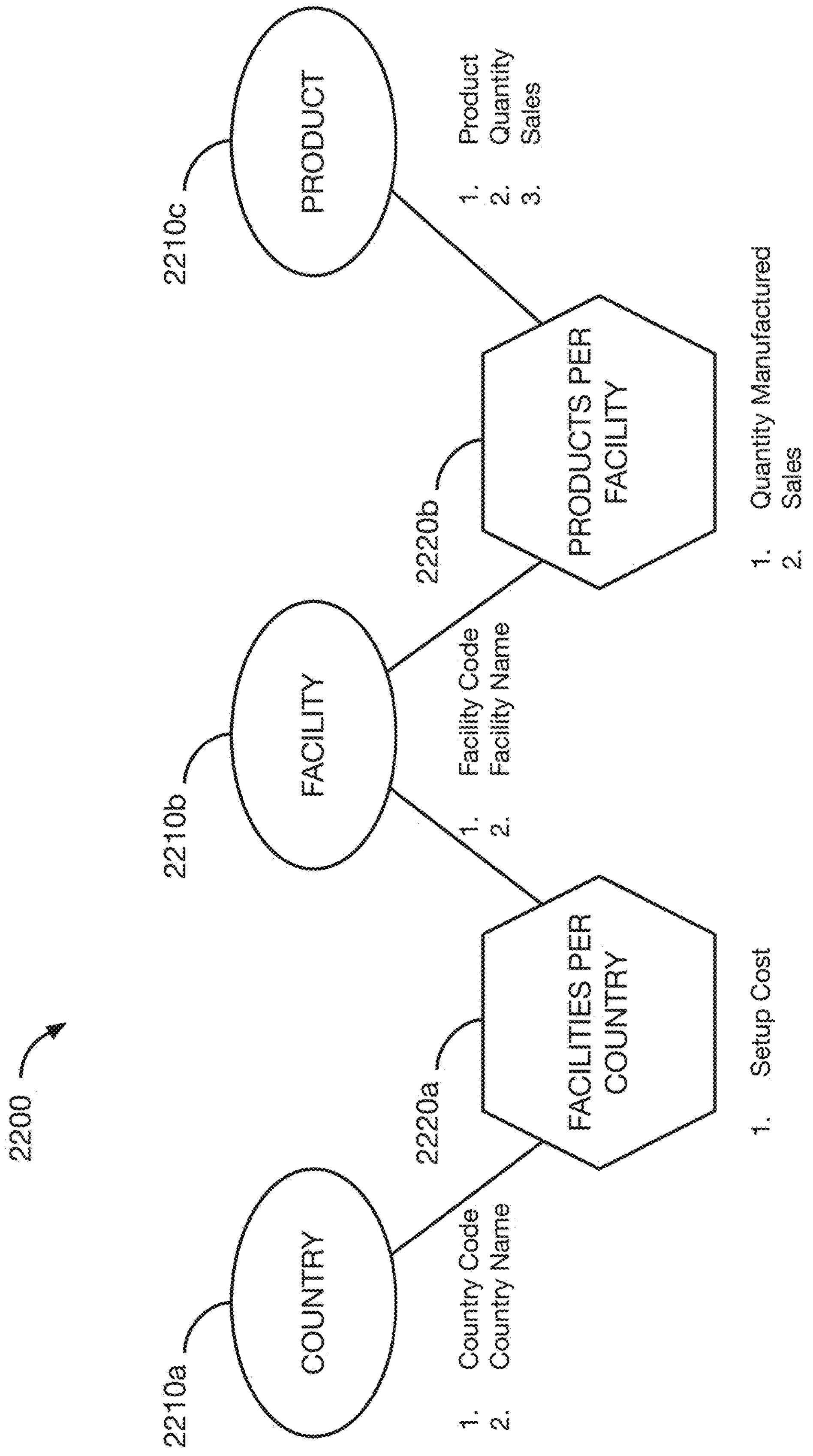
FIG. 22 depicts an example of a validation key and validation functions applied to an example portion of a semantic network in accordance with one or more embodiments of the present disclosure.

FIG. 22 depicts an example of a portion of a semantic network 2200 that may be used for the international product company with source data tables 2110, 2120, 2130 shown in FIG. 21. As depicted in this example, there are three nodes 2210 (i.e., "Country" 2210*a*, "Facility" 2210*b*, and "Product" 2210*c*) and two links 2220 (i.e., "Facilities per Country" 2220*a* and "Products per Facility" 2220*b*). Each node 2210 has a node identifier (e.g., "Country," "Facility," and "Product") and one or more associated node properties. For example, node properties "Country Name" and "Country Code" are two node properties of Country node 2210*a*. Similarly, node properties "Facility Name" and "Facility Code" are two node properties of Facility node 2210*b*. Finally, node properties "Product," "Quantity," and "Sales" are properties of Product node 2210*c*. As a general matter, the underlying data that is imported into the digital duplicate 108 will include node data and node property data. Node data and/or node property data may also be computed as a function or transformation of the underlying data 106 that is imported. Each link 2220 has a link identifier (e.g., "Facilities per Country" and "Products per Facility") and zero or more associated link properties. For example, link property "Setup Cost" is one such link property of the Facilities per Country link 2220*a*. Similarly, link properties "Quantity Manufactured" and "Sales" are link properties of the Products per Facility link 2220*b*. As a general matter, the underlying data that is imported into the digital duplicate 108 will include link data and link property data. Link data and/or link property data may also be computed as a function or transformation of the business data that is imported.

Figure 23:
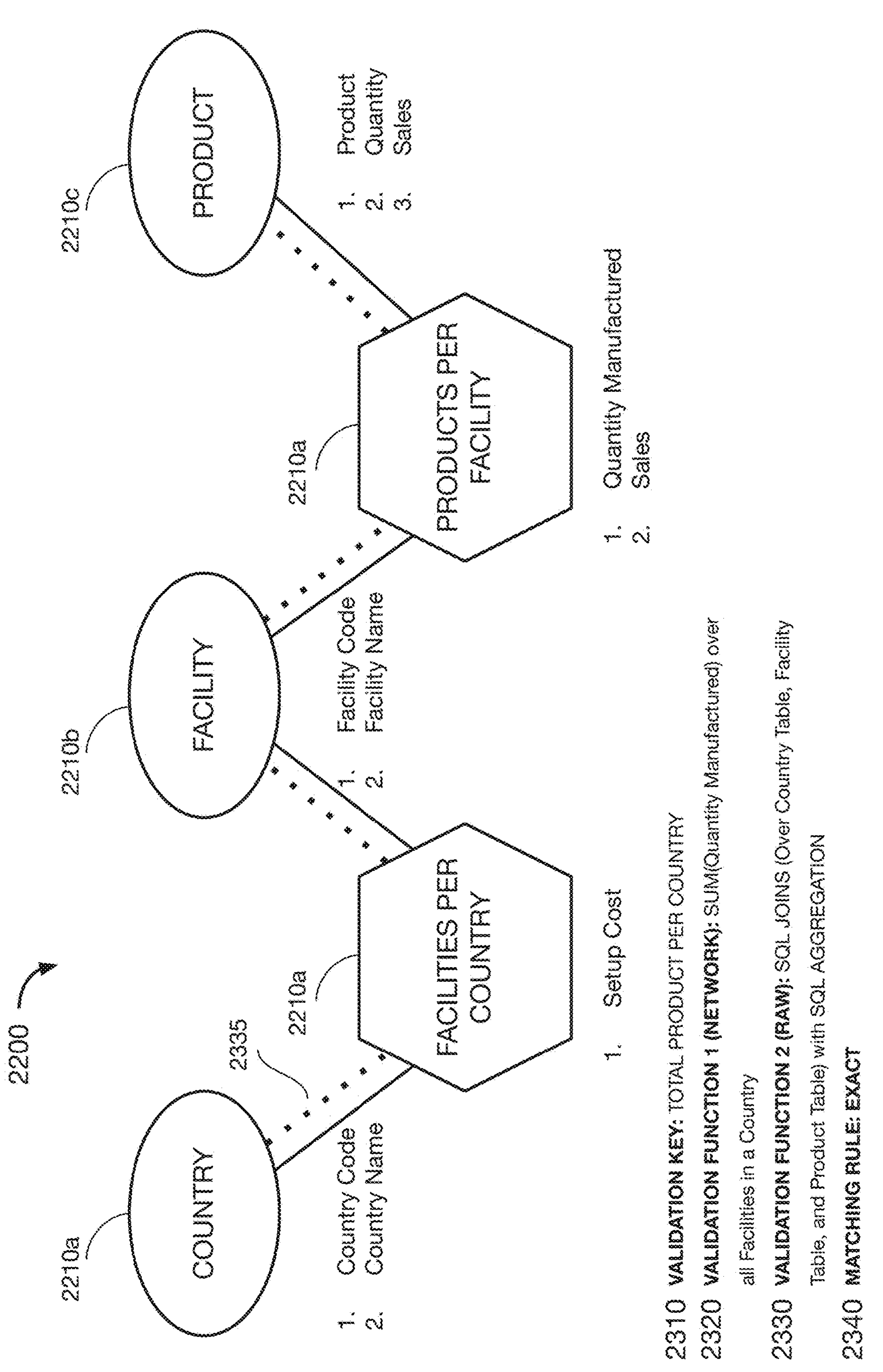
FIG. 23 depicts an example of a validation key and validation functions applied to an example portion of a semantic network in accordance with one or more embodiments of the present disclosure.

FIG. 23 depicts the example semantic network 2200 with a first validation point comprising a validation key 2310, two validation functions 2320 and 2330, and an "Exact" matching rule 2340. The validation key 2310 has been assigned the name "Total Product per Country."

The first validation function 2320 is a network function defined as the total amount of products manufactured over all facilities in a country, and is written in semantic form as "SUM (Quantity Manufactured) over all facilities in a country." The corresponding path 2325 (shown as a dotted line in FIG. 23) through the semantic network 2200 includes all nodes 2210 and all links 2220. It should be appreciated that FIGS. 22 and 23 depict a small set of nodes and links, which in some examples may constitute a subset of the total nodes and links for a given organization's digital duplicate. In other words, digital duplicates in practice may have many more nodes and links than those depicted in FIGS. 22 and 23. Thus, although the network function 2310 has a corresponding path that traverses all depicted nodes and links, it will be appreciated that in practice other network functions may not have corresponding paths that traverse all nodes and links, but rather traverse just a subject of a digital duplicate's nodes and links.

The second validation function 2330 is a raw function using the three tables 2100 of FIG. 21. The raw function may be written in semantic form as "SQL joins (over Country Table, Facility Table, and Product Table) with SQL aggregation."

As can be seen from this example, the total quantity of products manufactured over all facilities in a country as determined by the network function is expected to be an exact match to total determined by the raw function when calculated using SQL joins with SQL aggregation. It should be noted that between the raw source data and data in the semantic network a sequence of transformations exist which can transform the data in such a manner as to introduce errors or discrepancies. When the validation functions are evaluated with real data, discrepancies will indicate errors in the data or the transforms.

Figure 24:
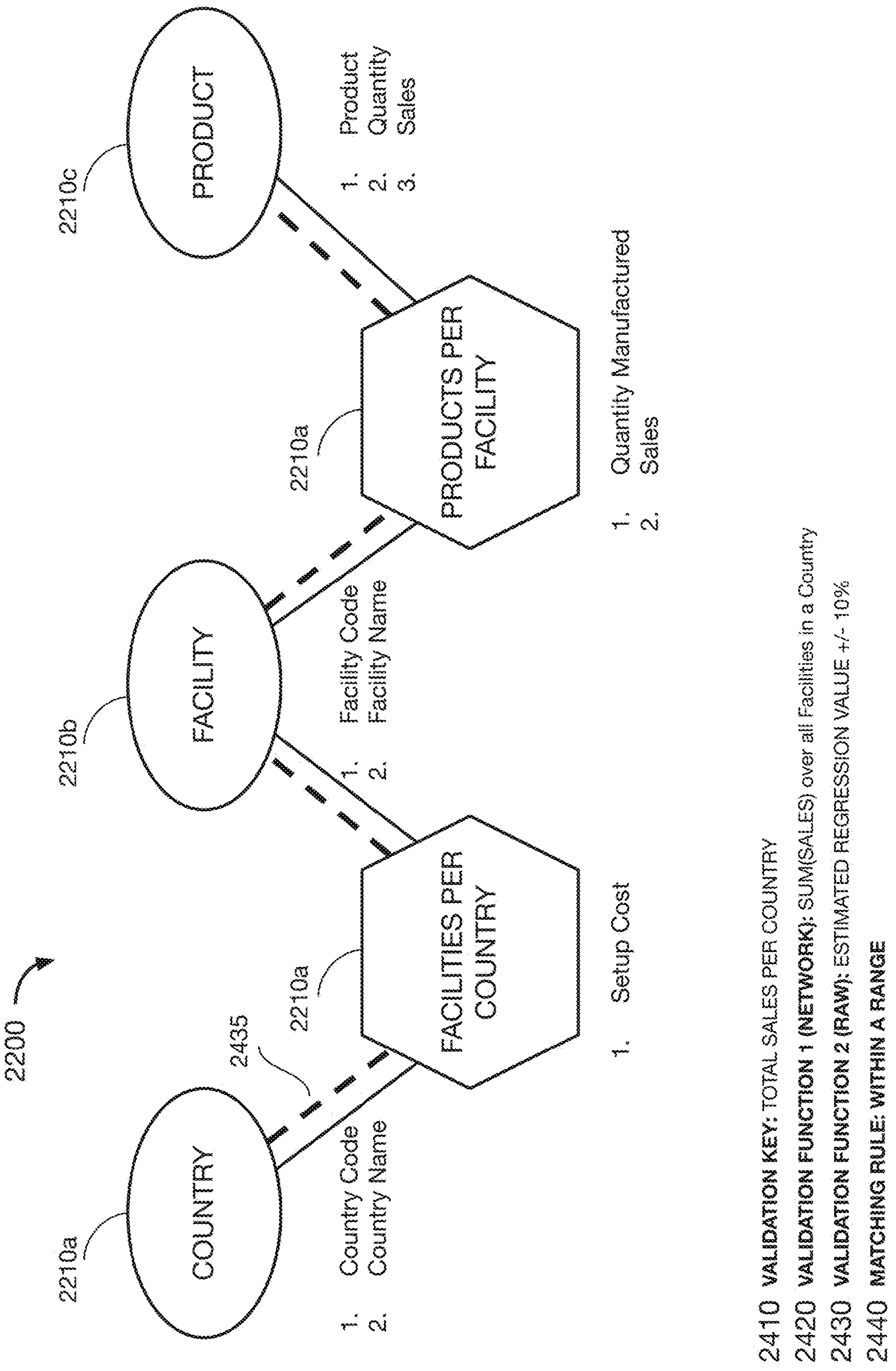
FIG. 24 depicts an example of a validation key and validation functions applied to an example portion of a semantic network in accordance with one or more embodiments of the present disclosure.

FIG. 24 depicts the example semantic network 2200 with a first validation point comprising a validation key 2410, two validation functions 2420 and 2430, and a "Within a Range" matching rule 2440. The validation key 2410 has been assigned the name "Total Sales per Country."

The first validation function 2420 is a network function defined as the total amount of product sales over all facilities in a country, and is written in semantic form as "SUM (Sales) over all Facilities in a Country." The corresponding path 2425 (shown as a dashed line in FIG. 24) through the semantic network 2200 includes all nodes 2210 and all links 2220.

The second validation function 2430 is a raw function using the three tables 2100 of FIG. 21. The raw function may be written in semantic form as "Estimated Regression Value+/−10%" In this example, the regression value is an estimated value that was generated using historical data from the previous months and a regression algorithm.

As can be seen from this example, the total quantity of products sold over all facilities as determined by the network function is expected to be within a range of 10% to the estimate that was calculated using a regression function on the previous months data. When the validation functions are evaluated with real data, discrepancies will indicate errors in the data or in transforms.

Example Data Stamping Technique

Data stamping is a technique that can be used within the framework of a digital duplicate (e.g., the digital duplicate 105 of FIG. 1A) to track the underlying data from the time it is imported as raw source data, transformed, and subsequently published into the digital duplicate 105. In accordance with this technique, each piece of data that is imported into the digital duplicate may be stamped with (i) a universally unique ID (e.g., a UUID); and (ii) a timestamp corresponding to the time it is first imported into the system. The unique ID may be applied to data in a particular input field or to a collection of input fields. The unique ID is used to follow the data as it flows through the system. The timestamp may be used, for example, to collect data with similar timestamps for making calculations. This is particularly useful when data is streaming directly into the digital duplicate 105 from a streaming source such as an IoT device, as opposed to being imported from a static file. In this case, the timestamp may be used to "time window" the data such that data from the same time window is used together in transformations.

Another use case for timestamping data as it is imported into the digital duplicate 105 may be one that provides a mechanism to understand when data is updated or changed. For example, a determination of what data has changed in the digital duplicate 105 may involve comparing a timestamp provided by the raw data source, and a timestamp stored with the imported data stored in the system. If the timestamp provided by the raw data source is newer than the timestamp stored with the imported data, then the new data should be imported to the system.

Example Lineage Technique

Lineage refers to a technique that can be used within the framework of a digital duplicate (e.g., the digital duplicate 105 of FIG. 1A) to identify a path through which a particular piece of data traverses (or flows) until it reaches its place or position in the semantic network. This path may contain a sequence of transformations that have been applied to a particular piece of data. Lineage allows a user to view or visualize this path in the reverse direction (starting from the data in the semantic network back to the data source). Lineage may work at two levels: metadata and data. The metadata lineage traces the path at the property, field, and/or column level. The data lineage traces the path at the row or instance level.

One or more visualization tools may be used to show the lineage between an aspect of the semantic network 108 and one or more underlying data sources. The data lineage uses the unique IDs and/or timestamps provided by the data stamping mechanism to track how the data is transformed and stored in the network. The metadata lineage uses the metadata as defined by the user (e.g., solution architect, data engineer, etc.) in tools such as, for example, an Architect tool 103, an Organizer tool 104, among other possible tools.

While analyzing the data in the semantic network, one may notice discrepancies in the value of a link or node property while executing the validation points. The cause of the discrepancy may lie in the source data or with some error in the transformation details. A lineage visualization tool may help to identify the data source and transformation details for the particular link or node property. This may be at the row or instance level (data lineage) or at the field level (metadata lineage). This makes troubleshooting discrepancies easier.

Example Visualization Tools

One or more of the software tools discussed above may also be configured to provide various visualizations that may assist a user in creating or developing aspects of the digital duplicate, such as by adding master nodes, master links, identifying source data to verify, creating and executing transforms, establishing and executing validation points, among other possible operations in accordance with the foregoing description. As a general matter, a visualization may comprise a graphical representation that is presented to a user via a graphical user interface on a computing device. It should be understood that the function of presenting a visualization includes, in some embodiments, sending, providing, or otherwise making available a set of instructions that operate to cause a client station to display the visualization.

In one particular embodiment, a software tool may be configured to present visualizations in the form of "perspectives" and "widgets" in order to help present underlying source data to a user. As used herein, a widget comprises any discrete visual representation of a set of related data typically involving one or more properties from a subnetwork (or "insight") of the digital duplicate. A widget generally has a particular format, with examples including line graphs, bar charts, pie charts, doughnut charts, or tables, to name a few. As a non-limiting example, one widget may present a bar chart visualization depicting an organization's revenue by month for a particular year. Another example widget may present a pie chart visualization depicting percentage revenue attributable to particular stores in a given region. Other examples may be possible as well. Generally, information that can be derived based on observing the widget may be referred to as an "insight."

A perspective generally comprises a compilation of individual widgets, with each widget generally relating to the same or similar concepts. A perspective generally has what is referred to as a "focal point," which is a node from the digital duplicate about which each widget in the perspective presents data. One example of a software tool that provides visualizations may be a navigation tool, which may include functionality that enables a user to (i) create perspectives, (ii) create widgets, and (iii) interact with the perspectives and widgets in order to navigate through visualizations, change the data presented via the widgets, and thereby uncover insights about the organization, although other operations and other software tools are possible.

CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:

a network interface;

at least one processor;

at least one non-transitory computer-readable medium; and program instructions stored on the at least one non-transitory computer-readable medium that are executable by the at least one processor such that the computing system is configured to perform functions including:

providing a digital duplicate data structure comprising a semantic network comprising nodes and links, wherein each node of the digital duplicate data structure is configured to contain data describing a respective aspect of an organization, and wherein each link of the digital duplicate data structure is configured to contain data describing a respective aspect of the organization and link together two or more nodes of the digital duplicate data structure;

receiving input defining a validation point, the validation point comprising (i) at least two or more validation functions applicable to (a) source data and (b) network data stored within the digital duplicate data structure and (ii) one or more rules for applying to results of the at least two or more validation functions;

importing given source data;

populating the given source data into at least one node or link from among the nodes and links of the digital duplicate data structure, wherein populating the given source data comprises applying one or more transformations to the given source data;

executing the validation point with respect to the given source data and the network data;

based on the executing, making a determination of whether the one or more rules applied to the results of the at least two or more validation functions are satisfied; and if the determination is that the one or more rules applied to the results of the at least two or more validation functions are satisfied, treating both the given source data and the network data as valid, wherein treating both the given source data and the network data as valid comprises refraining from revising the given source data and the network data stored within the digital duplicate data structure comprising the semantic network, but if the determination is that the one or more rules applied to the results of the at least two or more validation functions are not satisfied, performing one or more of (i) revising the given source data, whereby the revised given source data is thereafter populated into the at least one node or link or (ii) revising the network data stored within the digital duplicate data structure comprising the semantic network, wherein revising the network data comprises adjusting one of the one or more transformations applied to the given source data, said performing thereby resolving one or more errors that contributed to the one or more rules applied to the results of the at least two or more validation functions not being satisfied.

2. The computing system of claim 1, wherein the two or more validation functions comprise a first validation function and a second validation function, wherein each of the first and second validation functions comprises (i) a path through the semantic network connecting two or more nodes and passing through one or more links and (ii) at least one of a calculation or transformation applied to one or more properties of the two or more nodes and the one or more links included within the path, wherein the path of the first validation function is different than the path of the second validation function.

3. The computing system of claim 1, wherein the two or more validation functions comprise a raw function and a network function, wherein the raw function defines a sequence of at least one of one or more data transforms or one or more aggregate functions that operate on raw data of the given source data, and wherein the network function comprises (i) a path through the semantic network connecting two or more nodes and passing through one or more links and (ii) at least one of a calculation or transformation applied to one or more properties of the two or more nodes and one or more links included within the path.

4. The computing system of claim 1, wherein the one or more rules for applying to results of the at least two or more validation functions comprise an exact match rule that specifies results match exactly.

5. The computing system of claim 1, wherein the one or more rules for applying to results of the at least two or more validation functions comprise a range match rule that specifies results match within a range.

6. The computing system of claim 1, wherein the one or more rules for applying to results of the at least two or more validation functions comprise an error function match rule that specifies that results match based on an error function.

7. The computing system of claim 1, wherein adjusting one of the one or more transformations applied to the given source data alters the network data stored within the digital duplicate data structure.

8. The computing system of claim 1, further comprising program instructions stored on the at least one non-transitory computer-readable medium that are executable by the at least one processor such that the computing system is configured to perform functions including:

importing additional source data;

executing the validation point with respect to the additional source data and the network data; and based on the executing, determining that one or more of the one or more rules applied to the results of the at least two or more validation functions are satisfied.

9. The computing system of claim 1, wherein the two or more validation functions are stored with respect to different respective semantic networks.

10. The computing system of claim 1, wherein making the determination of whether the one or more rules applied to the results of the at least two or more validation functions are satisfied comprises determining whether data computed as a result of a first validation function is within a threshold measure of data computed as a result of a second validation function.

11. The computing system of claim 1, further comprising program instructions stored on the at least one non-transitory computer-readable medium that are executable by the at least one processor such that the computing system is configured to perform functions including:

causing a client station to present a lineage visualization that indicates a data source that contributed to the one or more rules applied to the results of the at least two or more validation functions not being satisfied, wherein the lineage visualization provides lineage information for the network data, and wherein the lineage information comprises, for each respective piece of a plurality of pieces of the network data, a path through which the respective piece of the network data flows from a data source until the respective piece of the network data reaches its position in the semantic network.

12. The computing system of claim 1, wherein:

each of the at least two or more validation functions is a pre-defined validation function; and each of the one or more rules is a pre-defined rule.

13. The computing system of claim 12, wherein each pre-defined validation function is defined prior to importing the given source data, and wherein each pre-defined rule is defined prior to importing the given source data.

14. The computing system of claim 1, wherein at least one of the two or more validation functions comprises a scalar function.

15. The computing system of claim 1, further comprising program instructions stored on the at least one non-transitory computer-readable medium that are executable by the at least one processor such that the computing system is configured to perform functions including:

causing a client station to present a lineage visualization that indicates a data source that contributed to the one or more rules applied to the results of the at least two or more validation functions not being satisfied; and sending an alert notification regarding the lineage visualization to a second client station.

16. The computing system of claim 1, further comprising program instructions that are executable by the at least one processor such that the computing system is configured to perform functions including:

causing a client station to present a lineage visualization that indicates a data source that contributed to the one or more rules applied to the results of the at least two or more validation functions not being satisfied.

17. The computing system of claim 1, further comprising:

storing, at the computing system, the digital duplicate data structure and the network data stored within the digital duplicate data structure; and obtaining, from a second computing system that is associated with a business-data data source, the given source data, wherein the given source data is stored at the second computing system, wherein revising the given source data comprises altering the given source data that is stored at the second computing system, and wherein revising the network data comprises adjusting the one of the one or more transformations applied to the given source data to alter the network data stored at the computing system.

18. The computing system of claim 1, wherein:

each node of the digital duplicate data structure is configured to contain data describing the respective aspect of the organization such that the data describing the respective aspect of the organization is arranged into a plurality of node properties in accordance with a defined property structure associated with the node;

each link of the digital duplicate data structure is configured to contain data describing the respective aspect of the organization such that the data describing the respective aspect of the organization is arranged into a plurality of link properties in accordance with a defined property structure associated with the link; and applying the one or more transformations to the given source data comprises applying the one or more transformations to the given source data, thereby arranging, for each respective node or link of the at least one node or link, transformed given source data among the plurality of node or link properties in accordance with the defined property structure associated with the respective node or link.

19. A non-transitory computer-readable storage medium having program instructions stored thereon that are executable by at least one processor of a computing system to cause the computing system to:

provide a digital duplicate data structure comprising a semantic network comprising nodes and links, wherein each node of the digital duplicate data structure is configured to contain data describing a respective aspect of an organization, and wherein each link of the digital duplicate data structure is configured to contain data describing a respective aspect of the organization and link together two or more nodes of the digital duplicate data structure;

receive input defining a validation point, the validation point comprising (i) at least two or more validation functions applicable to (a) source data and (b) network data stored within the digital duplicate data structure and (ii) one or more rules for applying to results of the at least two or more validation functions;

import given source data;

populate the given source data into at least one node or link from among the nodes and links of the digital duplicate data structure, wherein populating the given source data comprises applying one or more transformations to the given source data;

execute the validation point with respect to the given source data and the network data;

based on the executing, make a determination of whether the one or more rules applied to the results of the at least two or more validation functions are satisfied; and if the determination is that the one or more rules applied to the results of the at least two or more validation functions are satisfied, treat both the given source data and the network data as valid, wherein treating both the given source data and the network data as valid comprises refraining from revising the given source data and the network data stored within the digital duplicate data structure comprising the semantic network, but if the determination is that the one or more rules applied to the results of the at least two or more validation functions are not satisfied, perform one or more of (i) revising the given source data, whereby the revised given source data is thereafter populated into the at least one node or link or (ii) revising the network data stored within the digital duplicate data structure comprising the semantic network, wherein revising the network data comprises adjusting one of the one or more transformations applied to the given source data, said performing thereby resolving one or more errors that contributed to the one or more rules applied to the results of the at least two or more validation functions not being satisfied.

20. The non-transitory computer-readable storage medium of claim 19, wherein at least one of the two or more validation functions comprises a scalar function.

21. A method carried out by a computing system, the method comprising:

providing a digital duplicate data structure comprising a semantic network comprising nodes and links, wherein each node of the digital duplicate data structure is configured to contain data describing a respective aspect of an organization, and wherein each link of the digital duplicate data structure is configured to contain data describing a respective aspect of the organization and link together two or more nodes of the digital duplicate data structure;

receiving input defining a validation point, the validation point comprising (i) at least two or more validation functions applicable to (a) source data and (b) network data stored within the digital duplicate data structure and (ii) one or more rules for applying to results of the at least two or more validation functions;

importing given source data;

populating the given source data into at least one node or link from among the nodes and links of the digital duplicate data structure, wherein populating the given source data comprises applying one or more transformations to the given source data;

executing the validation point with respect to the given source data and the network data;

based on the executing, making a determination of whether the one or more rules applied to the results of the at least two or more validation functions are satisfied; and if the determination is that the one or more rules applied to the results of the at least two or more validation functions are satisfied, treating both the given source data and the network data as valid, wherein treating both the given source data and the network data as valid comprises refraining from revising the given source data and the network data stored within the digital duplicate data structure comprising the semantic network, but if the determination is that the one or more rules applied to the results of the at least two or more validation functions are not satisfied, performing one or more of (i) revising the given source data, whereby the revised given source data is thereafter populated into the at least one node or link or (ii) revising the network data stored within the digital duplicate data structure comprising the semantic network, wherein revising the network data comprises adjusting one of the one or more transformations applied to the given source data, said performing thereby resolving one or more errors that contributed to the one or more rules applied to the results of the at least two or more validation functions not being satisfied.

* * * * *